(12) United States Patent
Ogihara et al.

(10) Patent No.: US 11,390,055 B2
(45) Date of Patent: Jul. 19, 2022

(54) HOUSING MATERIAL FOR ELECTRICITY STORAGE DEVICE

(71) Applicant: TOPPAN PRINTING CO., LTD., Tokyo (JP)

(72) Inventors: Yu Ogihara, Tokyo (JP); Junya Imamoto, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 93 days.

(21) Appl. No.: 16/482,635

(22) PCT Filed: Jan. 29, 2018

(86) PCT No.: PCT/JP2018/002782
§ 371 (c)(1),
(2) Date: Jul. 31, 2019

(87) PCT Pub. No.: WO2018/147116
PCT Pub. Date: Aug. 16, 2018

(65) Prior Publication Data
US 2019/0348643 A1    Nov. 14, 2019

(30) Foreign Application Priority Data
Feb. 8, 2017 (JP) ............................. JP2017-021328

(51) Int. Cl.
*B32B 15/085* (2006.01)

(52) U.S. Cl.
CPC ...... *B32B 15/085* (2013.01); *B32B 2307/714* (2013.01); *B32B 2323/10* (2013.01); *Y10T 428/252* (2015.01); *Y10T 428/2852* (2015.01)

(58) Field of Classification Search
CPC ............ B32B 15/085; B32B 2307/714; B32B 2323/10; Y10T 428/252; Y10T 428/2852
(Continued)

(56) References Cited

U.S. PATENT DOCUMENTS

2013/0209868 A1* 8/2013 Suzuta .................. B32B 7/02
429/176
2014/0255692 A1* 9/2014 Perego .................. H01B 3/22
428/379

(Continued)

FOREIGN PATENT DOCUMENTS

| CN | 104662050 A | 5/2015 |
|---|---|---|
| CN | 105793299 A | 7/2016 |

(Continued)

OTHER PUBLICATIONS

Extended European Search Report dated Oct. 30, 2020, in corresponding European Patent Application No. 18750635.7.

(Continued)

*Primary Examiner* — Betelhem Shewareged

(57) ABSTRACT

A packaging material for a power storage device, the packaging material being prepared by laminating at least a substrate layer, a metallic foil layer with an anti-corrosion treatment layer being disposed on one face or both faces thereof, and a sealant layer in this order, wherein the sealant layer comprises an associative organic compound having two or more associative functional groups and a hydrocarbon group having 4 or more carbon atoms.

5 Claims, 6 Drawing Sheets

(58) Field of Classification Search
USPC .......................................................... 428/206
See application file for complete search history.

(56) References Cited

U.S. PATENT DOCUMENTS

| | | | |
|---|---|---|---|
| 2018/0076421 A1* | 3/2018 | Ogihara | B32B 27/08 |
| 2019/0348643 A1* | 11/2019 | Ogihara | B32B 7/12 |

FOREIGN PATENT DOCUMENTS

| | | |
|---|---|---|
| EP | 2 629 348 A1 | 8/2013 |
| EP | 3255695 A1 | 12/2017 |
| JP | 2002-245983 | 8/2002 |
| JP | 2013-053183 A | 3/2013 |
| JP | 2013-87152 A | 5/2013 |
| JP | 2013-222555 A | 10/2013 |
| JP | 2015-210882 | 11/2015 |
| JP | 2016-143615 A | 8/2016 |
| JP | 2016-207564 | 12/2016 |
| JP | 2017-91767 A | 5/2017 |
| WO | WO 2016/125684 A1 | 8/2016 |
| WO | WO 2016/199754 A1 | 12/2016 |
| WO | WO 2017/209184 A1 | 12/2017 |
| WO | WO 2017/217229 A1 | 12/2017 |

OTHER PUBLICATIONS

Office Action dated Dec. 15, 2020 in corresponding Japanese Patent Application No. 2017-021328 (3 pages).
International Search Report dated Mar. 13, 2018 in corresponding International Patent Application No. PCT/JP2018/002782.
Translation by WIPO of the International Preliminary Report on Patentability dated Aug. 22, 2019 in corresponding International Patent Application No. PCT/JP2018/002782.
Notification of Information Provision under Rule 114 dated Nov. 5, 2021 in European Patent Application No. 18750635.7 (11 pages).
Chinese Office Action dated Mar. 25, 2022 in Chinese Patent Application No. 201880003307.3.

* cited by examiner

US 11,390,055 B2

HOUSING MATERIAL FOR ELECTRICITY STORAGE DEVICE

CROSS-REFERENCE TO RELATED APPLICATIONS

This application is a U.S. National Stage Application, which claims the benefit under 35 U.S.C. § 371 of PCT International Patent Application No. PCT/JP2018/002782, filed Jan. 29, 2018 which claims the foreign priority benefit under 35 U.S.C. § 119 of Japanese Patent Application No. 2017-021328 filed on Feb. 8, 2017, the contents of which are incorporated herein by reference.

TECHNICAL FIELD

The present invention relates to a packaging material for a power storage device.

BACKGROUND ART

As power storage devices, secondary batteries such as lithium ion batteries, nickel-hydrogen batteries and lead storage batteries, as well as electrochemical capacitors such as electric double layer capacitors are known, for example. In view of downsizing of mobile devices, limitation in space for installation, or the like, further downsizing of power storage devices has been required, and lithium ion batteries with high energy density have been watched with interest. As packaging materials for use in lithium ion batteries, metallic cans had conventionally been used; however, multi-layered films with light weight, high heat releasing ability, and being able to be produced with a layer/metallic foil layer/sealant layer) have started to be used.

In a lithium ion battery using the above multi-layered film as a packaging material, a configuration for covering the battery contents with a packaging material including an aluminum foil layer as a metallic foil layer has been employed in order to prevent infiltration of moisture into the interior of the lithium ion battery. Lithium ion batteries in which such a configuration is employed are referred to as lithium ion batteries of an aluminum laminated type. In battery contents within lithium ion batteries, a positive electrode, a negative electrode and a separator, as well as an electrolytic solution in which a lithium salt as an electrolyte has been dissolved into an aprotic solvent having osmotic force, such as propylene carbonate, ethylene carbonate, dimethyl carbonate, diethyl carbonate, ethyl methyl carbonate or the like, or an electrolyte layer consisting of a polymeric gel impregnated with the electrolytic solution are included.

As a lithium ion battery of an aluminum laminated type, an lithium ion battery of an embossed type in which a depressed part is formed on a portion of a packaging material by cold molding, and battery contents are held in the depressed part, and the remaining portion of the packaging material is folded back to seal the edge of the packaging material by heat seal is known, for example. Packaging materials constituting such a lithium ion battery have been required to exhibit steady sealability resulting from heat seal, and also required to tend not to occur decrease in laminating strength between an aluminum foil layer and a sealant layer due to an electrolytic solution of the battery contents.

Also, thinning of a substrate layer, a metallic foil layer and a sealant layer in a packaging material for a power storage device is advancing with downsizing of power storage devices, and in these situations, decrease in the insulation properties due to the sealant layer being thinned is problematic.

Therefore, for example, in Patent Literature 1, a packaging material is proposed, the packaging material comprising a heat seal layer (sealant layer) including an adhesive polymethyl pentene layer, and as a result of this, the packaging material being able to be steadily sealed by heat and pressure in heat seal without short circuit between a barrier layer and tabs of the packaging material.

CITATION LIST

Patent Literature

Patent Literature 1: Japanese Unexamined Patent Application Publication No. 2002-245983

SUMMARY OF INVENTION

Technical Problem

In order to allow a lithium ion battery to store energy, it is necessary to perform charge and discharge of the lithium ion battery under predetermined conditions of an electrical current value, a voltage value, an ambient temperature and the like to occur chemical change (chemical conversion). This chemical conversion step is performed with the lithium ion battery being a temporal battery to which an electrolytic solution is injected. Then, once the battery is opened for removal of a gas generated by chemical conversion or for reloading of the electrolytic solution, final seal is subsequently performed to manufacture a battery. This final seal seals a portion of the battery that have been dipped into the electrolytic solution once, this final seal is therefore a degassing seal (degassing heat seal) in which heat seal is performed while sandwiching the electrolytic solution between portions to be heat-sealed.

In a conventional packaging material as described in the above Patent Literature 1, a solution to decrease in insulation properties due to contact between tab leads and a metallic foil layer has been accomplished. However, according to investigations by the present inventors up to now, it has been found that decrease in insulation properties are often caused by destruction of a sealant layer due to degassing heat sealing, and solution to this decrease in insulation properties is of highly importance. In Patent Literature 1, studies with regard to the destruction of a sealant layer due to degassing heat sealing have not been accomplished.

A degassing heat seal heat-seals portions while sandwiching the electrolytic solution between the portions to be heat-sealed when a packaging material accommodating battery contents is sealed by heat seal, and therefore, in some cases, the electrolytic solution bubbles and the sealant layer is destructed. Then, it is considered that the electrolytic solution enters from a portion of the sealant layer being destructed, and contacts a metallic foil layer, and as a result of this, insulation properties decrease.

In addition, the decrease in insulation properties resulting from the destruction of the sealant layer due to the degassing heat seal tends to be influenced by thinning of the sealant layer, and therefore, among improvements in insulation properties, a solution to this decrease in insulation properties is particularly demanded toward the future.

The present invention has been accomplished in view of the problems that the above conventional technology has, and it is an object of the present invention to provide a packaging material for a power storage device satisfactorily maintaining insulation properties after degassing heat sealing.

Solution to Problem

The present invention provides a packaging material for a power storage device, the packaging material being prepared by laminating at least a substrate layer, a metallic foil layer with an anti-corrosion treatment layer being disposed on one face or both faces thereof, and a sealant layer in this order, wherein the sealant layer comprises an associative organic compound having two or more associative functional groups and a hydrocarbon group having 4 or more carbon atoms.

On the basis of a packaging material for a power storage device having the above configuration, even when the sealant layer is thinned, it is possible to satisfactorily maintain insulation properties after degassing heat sealing. The present inventors presume that the reason why the above packaging material for a power storage device achieves such an effect is as follows. In steps of producing the power storage device such as heat sealing, degassing heat sealing and molding, the sealant layer of the packaging material for a power storage device undergoes deformation associated with changes in volume such as swelling of the electrolytic solution, crystallization and stretching over and over again, and as a result of this, defects tend to occur. In particular, due to thinning of the sealant layer, in the degassing heat seal in which the heat seal is performed while sandwiching the electrolytic solution between portions to be heat-sealed, deformation of the sealant layer considered to be caused by volatilization (bubbling) of the electrolytic solution becomes larger, and as a result of this, insulation properties tends to decrease. With regard to the reason of the decrease in insulation properties due to this deformation, for example, it is considered that, as a result of bubbling, the vicinity of the metallic foil layer tends to be exposed, and the electrolytic solution contacts the exposed portion. Also in a top seal in which a plurality of materials such as a tab sealant and metal tabs are heat-sealed at a time, decrease in insulation properties considered to be caused by crack tends to occur. In the present invention, the sealant layer comprises an associative organic compound having two or more associative functional groups and a hydrocarbon group having 4 or more carbon atoms. This associative organic compound has a hydrocarbon group having 4 or more carbon atoms, and therefore, when this associative organic compound is heated in a step of producing a packaging material, this associative organic compound and a resin in a melted state can be homogeneously dissolved in one another. On the other hand, when this associative organic compound is cooled, the associative functional groups associate with each other by noncovalent intermolecular interaction, and the associative organic compound grows in a three-dimensional manner. Then, the associative organic compound self-assembles and self-organizes, and as a result of this, aggregation force increases to form an associate like a macromolecule (a three-dimensional network). With the progression of the formation of this associate, the phase-separated sealant resin and the three-dimensional network are entangled with each other, and it is possible to increase melt viscosity of the sealant layer when the associative organic compound is heated again at a temperature that is higher than or equal to the melting point of the sealant resin and that is less than or equal to the melting point of the associative organic compound. As a result of this, it is considered that it is possible to suppress bubbling of the electrolytic solution, and suppress decrease in insulation properties after degassing heat sealing.

In the above packaging material for a power storage device, it is preferable that the above associative organic compound be a sorbitol derivative represented by the following formula (1), or a nonitol derivative represented by the following formula (2). When the associative organic compound is the above sorbitol derivative or the above nonitol derivative, it tends to enable further suppression of decrease in insulation properties after degassing heat sealing

[Chemical Formula 1]

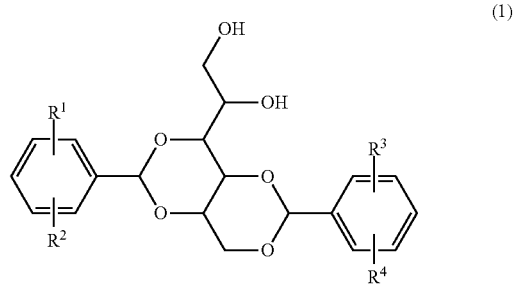

(1)

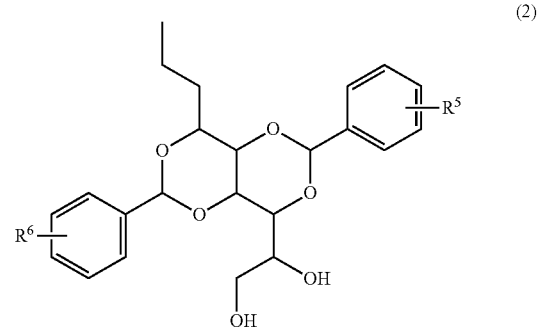

(2)

(In the formula (1), $R^1$ to $R^4$ each independently represent a hydrogen atom or a hydrocarbon group having 1 to 6 carbon atoms, and in the formula (2), $R^5$ and $R^6$ each independently represent a hydrogen atom or a hydrocarbon group having 1 to 6 carbon atoms.)

In the above packaging material for a power storage device, it is preferable that the content of the above associative organic compound be 0.01 to 1.0% by mass based on the total mass of the above sealant layer. When the content of the associative organic compound is 0.01% by mass or more, a three-dimensional network tends to be formed, and the effect of suppressing decrease in insulation properties after degassing heat sealing (bubbling suppressing effect) tends to be achieved. Also, when the content of the associative organic compound is 1.0% by mass or less, it tends to reduce the amount of the associative organic compounds that do not associate with each other, suppress bleeding out thereof, and suppress the inhibition of expression of other properties.

In the above packaging material for a power storage device, the above sealant layer consists of a plurality of layers, and at least one layer of the plurality of the layers may be a layer comprising the above associative organic compound. In this case, it is preferable that a layer closest to the above metallic foil layer among the plurality of the sealant layers be a layer comprising the above associative organic compound. As a result of the fact that the sealant layer comprises the associative organic compound in the layer closest to the metallic foil layer, the decrease in insulation properties after degassing heat sealing tends to be further suppressed. Bubbling of the electrolytic solution in degassing heat sealing tends to occur at a portion of the sealant layer close to the metallic foil layer, and it tends to suppress the decrease in insulation properties more efficiently by forming a three-dimensional network made of the associative organic compound in the layer closest to the metallic foil layer.

In addition, the layer closest to the above metallic foil layer among the plurality of the sealant layers may be a layer further comprising acid-modified polypropylene, and polypropylene with an atactic structure or a propylene-α-olefin copolymer with an atactic structure. As a result of this, it tends to retain adhesion between the sealant layer and the metallic foil layer, prevent generation of source of bubbling of the electrolytic solution, and further suppress the decrease in insulation properties after degassing heat sealing.

In the above packaging material for a power storage device, the above anti-corrosion treatment layer may comprise cerium oxide, 1 to 100 parts by mass of phosphoric acid or a phosphate per 100 parts by mass of the cerium oxide, and a cationic polymer. As a result of the fact that such a packaging material for a power storage device, it tends to retain the adhesion between the sealant layer and the metallic foil layer, prevent the generation of source of bubbling of the electrolytic solution, and further suppress the decrease in insulation properties after degassing heat sealing.

Advantageous Effects of Invention

According to the present invention, it is possible to provide a packaging material for a power storage device that can satisfactorily maintain insulation properties after degassing heat sealing.

DESCRIPTION OF EMBODIMENTS

Figure 1:
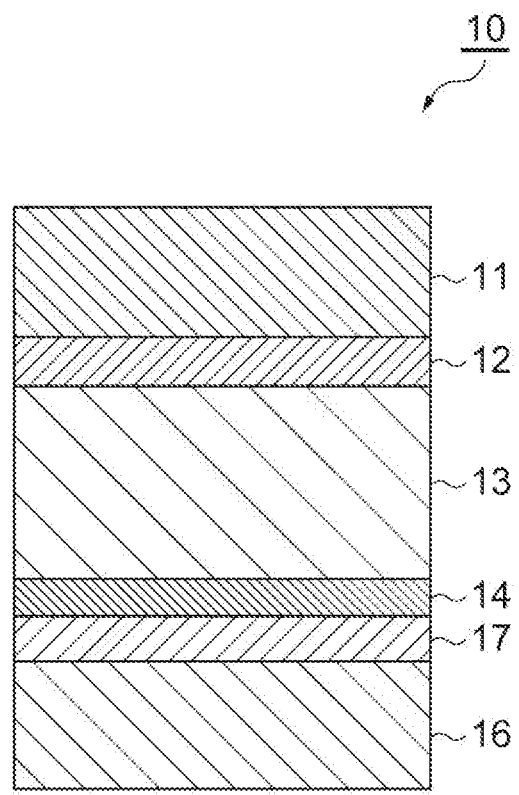
FIG. 1 is a schematic cross-sectional view of a packaging material for a power storage device according to one embodiment of the present invention.

Suitable embodiments of the present invention will be illustrated in detail below with reference to the drawings. Note that, in the drawings, the same or the corresponding parts are provided with the same reference signs, and the overlapping descriptions are omitted. Also, the dimensional ratios in the drawings are not limited to the ratios shown in the drawings.

[Packaging Material for Power Storage Device]

FIG. 1 is a cross-sectional view schematically illustrating one embodiment of a packaging material for a power storage device of the present embodiment. As shown in FIG. 1, a packaging material (a packaging material for a power storage device) 10 of the present embodiment is a laminate in which a substrate layer 11, an adhesive layer 12 (sometimes referred to as first adhesive layer 12) formed on one face of the substrate layer 11, a metallic foil layer 13 formed on a face of the first adhesive layer 12 opposite to the substrate layer 11, an anti-corrosion treatment layer 14 formed on a face of the metallic foil layer 13 opposite to the first adhesive layer 12, an adhesive layer 17 (sometimes referred to as second adhesive layer 17) formed on a face of the anti-corrosion treatment layer 14 opposite to the metallic foil layer 13, and a sealant layer 16 formed on a face of the second adhesive layer 17 opposite to the anti-corrosion treatment layer 14 are laminated in this order. In the packaging material 10, the substrate layer 11 is the outermost layer, and the sealant layer 16 is the innermost layer. In other words, the packaging material 10 is used such that the substrate layer 11 is directed toward the side of the exterior of the power storage device, and the sealant layer 16 is directed toward on the side of the interior of the power storage device. Each of the layers will be described below.

<Substrate Layer 11>

The substrate layer 11 is provided for the purpose of imparting heat resistance in a sealing step in the production of a power storage device, and achieving the solution to pinholes that can be occurred during the processing or the distribution, and it is preferable to use a resin layer having insulation properties. As such a resin layer, for example, it is possible to use a stretched or unstretched film such as a polyester film, a polyamide film, a polypropylene film, as a single layer, or as a multi-layered film in which two or more thereof are laminated. It is also possible to use a co-extruded multilayered stretched film prepared by the coextrusion of a polyethylene terephthalate (PET) film and a nylon (Ny) film by using an adhesive resin followed by subjecting to stretching treatment.

The substrate layer 11 may be disposed by directly applying the substrate layer 11 on a metallic foil layer 13 described below. In this case, a first adhesive layer 12 described below is not required. As a method for forming the substrate layer by application, it is possible to employ a method for conducting the application of a coating solution of a resin such as an urethane resin, an acrylic resin and a polyester resin, and conducting the curing by ultraviolet irradiation, heating at elevated temperatures, aging (curing) treatment and the like. The application method is not limited in particular, and it is possible to employ a variety of processes such as gravure coating, reverse coating, roll coating and bar coating.

It is preferable that the thickness of the substrate layer 11 be 3 to 40 μm, and it is more preferable that this thickness be 5 to 25 μm. As a result of the fact that the thickness of the substrate layer 11 is 3 μm or more, it tends to enable improvement in pinhole resistance and insulation properties of the packaging material for a power storage device 10. On the other hand, as a result of the fact that the thickness of the substrate layer 11 is 40 μm or less, it tends to further enhance deep drawing moldability of the packaging material for a power storage device 10.

<First Adhesive Layer 12>

The first adhesive layer 12 is a layer for adhering the substrate layer 11 to the metallic foil layer 13. Specific examples of materials constituting the first adhesive layer 12 include polyurethane resins prepared by reacting a base material such as polyester polyol, polyether polyol, acrylic polyol and carbonate polyol with a bifunctional or higher isocyanate compound.

Depending on functions and performance required for the packaging material, a variety of the polyols described above can be used alone, or used as a combination of two or more thereof.

Also, depending on performance required for the adhesive, it is also possible to formulate a variety of other additives and stabilizers into the above-described polyurethane resin.

Although the thickness of the first adhesive layer 12 is not limited in particular, it is preferable that the thickness of the first adhesive layer 12 be, for example, 1 to 10 µm, and it is more preferable that this thickness be 3 to 7 µm in view of achieving desired adhesive strength, conformability, processability and the like.

<Metallic Foil Layer 13>

The metallic foil layer 13 has steam barrier properties that prevent infiltration of moisture into the interior of the power storage device. Also, the metallic foil layer 13 has ductility for conducting deep drawing molding. As the metallic foil layer 13, it is possible to use a variety of metallic foils such as aluminum, stainless steel and copper, and in view of mass (specific gravity), moisture proofing, processability and cost, an aluminum foil is preferable.

As the aluminum foil, in view of the impartment of ductility in desired molding, it is possible to preferably use, in particular, a soft aluminum foil subjected to annealing treatment; however, for the purpose of the impartment of further pinhole resistance, and ductility in molding, it is more preferable to use an aluminum foil including iron. It is preferable that the content of iron in the aluminum foil be 0.1 to 9.0% by mass per 100% by mass of the aluminum foil, and it is more preferable that this content be 0.5 to 2.0% by mass. As a result of the fact that the content of iron is 0.1% by mass or more, it is possible to obtain a packaging material 10 having better pinhole resistance and ductility. As a result of the fact that the content of iron is 9.0% by mass or less, it is possible to obtain a packaging material 10 having better flexibility.

Although the thickness of the metallic foil layer 13 is not limited in particular, it is preferable that the thickness of the metallic foil layer 13 be 9 to 200 µm in view of barrier properties, pinhole resistance and processability, and it is more preferable that this thickness be 15 to 100 µm.

When an aluminum foil is used as the metallic foil layer 13, as an aluminum foil, it is possible to use an untreated aluminum foil; however, it is preferable to use an aluminum foil subjected to degreasing treatment in view of the impartment of electrolytic solution resistance.

Note that, when the aluminum foil is subjected to the degreasing treatment, the degreasing treatment may be conducted on only one face of the aluminum foil, or both faces of the aluminum foil.

<Anti-Corrosion Treatment Layer 14>

The anti-corrosion treatment layer 14 is a layer that is disposed in order to prevent the corrosion of the metallic foil layer 13 by hydrofluoric acid generated from the reaction of the electrolytic solution or electrolytic solution with moisture. The anti-corrosion treatment layer 14 is formed, for example, by degreasing treatment, hydrothermal metamorphism treatment, positive electrode oxidizing treatment, chemical conversion treatment, or combination thereof.

Examples of the degreasing treatment include acid degreasing or alkali degreasing. Examples of the acid degreasing include methods in which an inorganic acid such as sulphuric acid, nitric acid, hydrochloric acid and hydrofluoric acid alone, or a solution of mixture thereof are used. Also, by using, as acid degreasing, an acid degreasing agent prepared by dissolving a fluorine-containing compound such as ammonium monosodium bifluoride with the above inorganic acid, and particularly in the case where an aluminum foil is used as the metallic foil layer 13, not only degreasing effect from aluminum is obtained, but also a fluoride of aluminum in the passivated form can be formed, and therefore, this is effective in view of hydrofluoric acid resistance. Examples of the alkali degreasing include methods using sodium hydroxide and the like.

Examples of the hydrothermal metamorphism treatment include boehmite treatment in which an aluminum foil is subjected to immersion treatment in boiled water with addition of triethanolamine.

Examples of the positive electrode oxidizing treatment include alumite treatment.

Examples of the chemical conversion treatment include chemical conversion treatment of a dipping type and chemical conversion treatment of an application type. Examples of the chemical conversion treatment of the dipping type include chromate treatment, zirconium treatment, titanium treatment, vanadium treatment, molybdenum treatment, calcium phosphate treatment, strontium hydroxide treatment, cerium treatment, ruthenium treatment, or a variety of chemical conversion treatment consisting of mixed phase thereof. On the other hand, examples of the chemical conversion treatment of the application type include a method for applying a coating agent having anti-corrosion performance on the metallic foil layer 13.

Among the anti-corrosion treatment, in the case where at least a portion of the anti-corrosion treatment layer is formed by any of the hydrothermal metamorphism treatment, the positive electrode oxidizing treatment, the chemical conversion treatment, it is preferable to conduct the above-described degreasing treatment in advance. Note that when a metallic foil that has been subjected to the degreasing treatment such as a metallic foil underwent the annealing step is used as the metallic foil layer 13, there is no need to conduct the degreasing treatment again in the formation of the anti-corrosion treatment layer 14.

The coating agent for use in the chemical conversion treatment of the application type preferably contains trivalent chrome. Also, at least one polymer selected from the group consisting of a cationic polymer and an anionic polymer that are described below may be included in the coating agent.

Also, among the above treatment, particularly with regard to the hydrothermal metamorphism treatment and the positive electrode oxidizing treatment, a surface of an aluminum foil is dissolved with a treating agent to form an aluminum compound (boehmite, alumite) excellent in corrosion resistance. As a result of this, a co-continuous structure from the metallic foil layer 13 using the aluminum foil up to the anti-corrosion treatment layer 14 forms, and therefore, the above treatment is encompassed in the definition of the chemical conversion treatment. On the other hand, it is also possible to form the anti-corrosion treatment layer 14 only by a simple coating approach that is not encompassed in the definition of the chemical conversion treatment as described below. Examples of this method include a method in which a sol of a rare earth element oxide such as cerium oxide with an average particle size of 100 nm or less is used as a material having anti-corrosion effect (inhibitor effect) due to aluminum, and being suitable with regard to an environmental aspect. By means of this method, it is possible to impart the anti-corrosion effect to a metallic foil such as an aluminum foil, even by a typical coating.

Examples of the above sol of the rare earth element oxide include sols obtained by using a variety of solvents such as water-based solvents, alcohol-based solvents, hydrocarbon-based solvents, ketone-based solvents, ester-based solvents and ether-based solvents. Among these, a water-based sol is preferable.

In the above sol of the rare earth element oxide, usually in order to stabilize the dispersion of the sol, inorganic acids such as nitric acid, hydrochloric acid and phosphoric acid, or salts thereof, and organic acids such as acetic acid, malic acid, ascorbic acid and lactic acid are used as dispersion stabilizing agents. Among these dispersion stabilizing agents, in particular, phosphoric acid is expected to, in the packaging material 10, (1) provide the stabilization of sol dispersion, (2) improve the adhesiveness to the metallic foil layer 13 by means of aluminum chelating ability of phosphoric acid, (3) impart the electrolytic solution resistance by trapping aluminum ions eluted under the influence of hydrofluoric acid (formation of passivated form), (4) improve the aggregation force of anti-corrosion treatment layer 14 (oxide layer) due to the fact that it tends to occur dehydration condensation of phosphoric acid at low temperatures, and the like.

Examples of the above phosphoric acid or a salt thereof include orthophosphoric acid, pyrophosphoric acid, metaphosphoric acid, or alkali metal salts and ammonium salts thereof. Among these, in order to express functions in the packaging material 10, condensed phosphoric acids such as trimetaphosphoric acid, tetrametaphosphoric acid, hexametaphosphoric acid and ultrametaphosphoric acid, or alkali metal salts and ammonium salts thereof are preferable. Also, in view of dry film formability (drying ability, heat quantity) when the anti-corrosion treatment layer 14 consisting of the rare earth element oxide is formed by a variety of coating processes using the above sol of the rare earth element oxide, sodium salts are more preferable due to the dehydration condensation ability of sodium salts at low temperatures. As phosphates, water soluble salts are preferable.

It is preferable that the mixing ratio of phosphoric acid (or a salt thereof) to the rare earth element oxide be 1 to 100 parts by mass per 100 parts by mass of the rare earth element oxide. When the above mixing ratio is 1 part by mass or more per 100 parts by mass of the rare earth element oxide, the sol of the rare earth element oxide become more stable, and the function of the packaging material 10 become better. It is more preferable that the above mixing ratio be 5 parts by mass or more per 100 parts by mass of the rare earth element oxide. Also, when the above mixing ratio is 100 parts by mass or less per 100 parts by mass of the rare earth element oxide, the function of the sol of the rare earth element oxide enhances, and the sol of the rare earth element oxide has good performance with regard to prevention of corrosion of the electrolytic solution. It is more preferable that the above mixing ratio be 50 parts by mass or less per 100 parts by mass of the rare earth element oxide, and it is further preferable that the above mixing ratio be 20 parts by mass or less.

The anti-corrosion treatment layer 14 formed by the above sol of the rare earth element oxide is an aggregate of inorganic particles, and therefore, even after undergoing a dry curing step, the aggregation force of this layer itself may be small. Therefore, it is preferable that the anti-corrosion treatment layer 14 in this case have been set to form a composite with the following anionic polymer or cationic polymer in order to supplement the aggregation force.

Examples of the anionic polymer include polymers having a carboxy group, such as poly(meth)acrylic acid (or a salt thereof), or a copolymer obtained by copolymerization of poly(meth)acrylic acids as a main component. Examples of the copolymerized components in this copolymer include alkyl (meth)acrylate-based monomer (as the alkyl group, methyl group, ethyl group, n-propyl group, i-propyl group, n-butyl group, i-butyl group, t-butyl group, 2-ethylhexyl group, cyclohexyl group, and the like); amide group-containing monomers such as (meth)acrylamide, N-alkyl (meth)acrylamide, N,N-dialkyl (meth)acrylamide (as the alkyl group, methyl group, ethyl group, n-propyl group, i-propyl group, n-butyl group, i-butyl group, t-butyl group, 2-ethylhexyl group, cyclohexyl group and the like), N-alkoxy (meth)acrylamide, N,N-dialkoxy(meth)acrylamide (as the alkoxy group, methoxy group, ethoxy group, butoxy group, isobutoxy group, and the like), N-methylol (meth)acrylamide, and N-phenyl(meth)acrylamide; hydroxy group-containing monomers such as 2-hydroxyethyl(meth)acrylate and 2-hydroxypropyl(meth)acrylate; glycidyl group-containing monomers such as glycidyl(meth)acrylate and allyl glycidylether; silane-containing monomers such as (meth)acryloxypropyltrimethoxysilane, (meth)acryloxypropyltriethoxysilane; and isocyanate group-containing monomers such as (meth)acryloxypropylisocyanate.

These anionic polymers play a role in improving the stability of the anti-corrosion treatment layer 14 (oxide layer) obtained by using the sol of the rare earth element oxide. This role is accomplished by the effect of protecting a hard but brittle oxide layer with an acrylic-based resin component, and the effect of trapping (cation trapping) an ion contaminant (in particular, a sodium ion) derived from a phosphate included in the sol of the rare earth element oxide. In short, when alkali metal ions and alkali earth metal ions such as sodium ions in particular are included in the anti-corrosion treatment layer 14 obtained by using the sol of the rare earth element oxide, the anti-corrosion treatment layer 14 tends to degrade with a site including these ions as an origin of the degradation. As a result of this, the resistance of the anti-corrosion treatment layer 14 enhances by immobilizing sodium ions and the like included in the sol of the rare earth element oxide due to the anionic polymer.

The anti-corrosion treatment layer 14 in which the anionic polymer and the sol of the rare earth element oxide are combined has anti-corrosion performance equivalent to that of an anti-corrosion treatment layer 14 formed by subjecting an aluminum foil to chromate treatment. It is preferable that the anionic polymer have a structure in which polyanionic polymers, which are essentially water-soluble, are cross-linked. Examples of the crosslinking agent for forming this structure include compounds having an isocyanate group, a glycidyl group, a carboxy group, and an oxazoline group.

Examples of the compound having an isocyanate include diisocyanates such as tolylenediisocyanate, xylylene diisocyanate or hydrogenation products thereof, hexamethylenediisocyanate, 4,4'-diphenylmethanediisocyanate or hydrogenation products thereof, and isophoronediisocyanate; or polyisocyanates such as adducts prepared by reacting these isocyanates with polyhydric alcohols such as trimethylolpropane, biurets obtained by reacting these isocyanates with water, or trimeric isocyanurates; or blocked polyisocyanates prepared by blocking these polyisocyanates with alcohols, lactams, oximes and the like.

Examples of the compound having a glycidyl group include epoxy compounds obtained by reacting glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol and neopentylglycol with epichlorohydrin; epoxy compounds obtained by reacting polyhydric alcohols such as glycerin, polyglycerin, trimethylolpropane, pentaerythritol and sorbitol with epichlorohydrin; and epoxy compounds obtained by reacting dicarboxylic acids such as phthalic acid, terephthalic acid, oxalic acid and adipic acid with epichlorohydrin.

Examples of the compound having a carboxy group include a variety of aliphatic or aromatic dicarboxylic acids. Also, it is possible to use poly(meth)acrylic acids and alkali (earth) metal salts of poly(meth)acrylic acids.

Examples of the compound having an oxazoline group include low molecular compounds having two or more oxazoline units, or when using polymerizable monomers such as isopropenyl oxazoline, compounds copolymerized with acrylic-based monomers such as (meth)acrylic acid, alkyl (meth)acrylate esters and hydroxyalkyl (meth)acrylate.

Also, it is possible to react an anionic polymer and a silane coupling agent, more specifically, selectively react a carboxy group of the anionic polymer and a functional group of the silane coupling agent to achieve a crosslinking point as a siloxane bond. In this case, it is possible to use γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, vinyltrichlorosilane, γ-mercaptopropyltrimethoxysilane, γ-aminopropyltriethoxysilane, N-β(aminoethyl)-γ-aminopropyltrimethoxysilane, γ-isocyanatopropyltriethoxysilane, and the like. Among these, in view of reactivity with an anionic polymer or a copolymer thereof in particular, epoxy silane, aminosilane and isocyanate silane are preferable.

It is preferable that the ratio of these crosslinking agents to the anionic polymer be 1 to 50 parts by mass per 100 parts by mass of the anionic polymer, and it is more preferable that this ratio be 10 to 20 parts by mass. When this ratio of the crosslinking agent is 1 part by mass or more per 100 parts by mass of the anionic polymer, the crosslinked structure tends to be formed satisfactorily. When the ratio of the crosslinking agent is 50 parts by mass or less per 100 parts by mass of the anionic polymer, pot life of the coating solution increases.

The process for crosslinking the anionic polymers is not limited to the above crosslinking agent, and may be a process for forming crosslinking of ions by using a titanium compound or a zirconium compound.

Examples of the cationic polymer include polymers having an amine, and examples of the polymers having an amine include polyethyleneimine, ionic macromolecular complex consisting of polyethyleneimine and polymers having a carboxylic acid, primary amine grafted acrylic resins obtained by grafting a primary amine onto an acrylic main backbone, polyallylamine, or derivatives thereof, and cationic polymers such as aminophenol. Examples of the polyallylamine include homopolymers or copolymers of allylamines, allylamine amidosulfates, diallylamines, and dimethylallylamines. These amines can be fee amines, or can be those stabilized by acetic acid or hydrochloric acid. Also, as the copolymerized components, it is possible to use maleic acid, sulfur dioxide, and the like. In addition, it is possible to use amines imparted with heat crosslinking ability by subjecting primary amine to partial methoxylation, and it is also possible to use aminophenol. In particular, allylamine or derivatives thereof is preferable.

It is preferable to use the cationic polymer in combination with a crosslinking agent having a functional group reactive with amine/imine such as a carboxy group and a glycidyl group. As the crosslinking agent used in combination with the cationic polymer, it is possible to use polymers having a carboxylic acid that forms ionic macromolecular complex with polyethyleneimine, and examples of these polymers include polycarboxylic acids (salts) such as polyacrylic acids or ionic salts thereof, or copolymers prepared by introducing comonomers in these polycarboxylic acids (salts), and polysaccharides having a carboxy group such as carboxymethyl cellulose or ionic salts thereof.

In the present embodiment, the cationic polymer is described as one constituent constituting the anti-corrosion treatment layer 14. The reason is that, as a result of diligent studies that have been made by means of various compounds in order to impart electrolytic solution resistance and hydrofluoric acid resistance required for a packaging material for a power storage device, it has been found that the cationic polymer itself is a compound that can impart electrolytic solution resistance and hydrofluoric acid resistance. The factor contributing to this is speculated to be the fact that damage of the aluminum foil is suppressed by trapping fluorine ions with cationic groups (anion trap).

The cationic polymer is more preferable material in view of improvement in adhesiveness. Also, the cationic polymer is water soluble in a manner analogous to the above anionic polymer, and it is therefore more preferable to form a crosslinked structure in the cationic polymer to impart water resistance to the cationic polymer. As a crosslinking agent for forming a crosslinked structure in the cationic polymer, it is possible to use the crosslinking agents illustrated in the section with regard to the anionic polymer. When the sol of the rare earth element oxide is used as the anti-corrosion treatment layer 14, the cationic polymer can be used as a protective layer of the anti-corrosion treatment layer 14, instead of using the above anionic polymer.

The anti-corrosion treatment layer resulting from the chemical conversion treatment represented by the chromate treatment is obtained by, in order to form an inclined structure in relation to the aluminum foil, treating an aluminum foil with a chemical conversion treating agent to which hydrofluoric acid, hydrochloric acid, nitric acid, sulphuric acid or salts thereof is mixed in particular, followed by reacting the aluminum foil with chromium-based or non-chromium-based compound to form a chemical conversion-treated layer on the aluminum foil. However, the above chemical conversion treatment uses acids as chemical conversion treating agents, and as a result of this, involves degradation of working conditions or corrosion in the coating device. On the other hand, in contrast to chemical conversion treatment represented by the chromate treatment, the above-described anti-corrosion treatment layer 14 of a coating type is not required to form an inclined structure in relation to the metallic foil layer 13 using the aluminum foil. Therefore, the nature of the coating agent is not limited with regard to acidic properties, alkaline properties, neutral properties and the like, and it is possible to accomplish good working conditions. In addition, due to the fact that alternative solution to the chromate treatment using a chromium compound is demanded in view of environmental sanitation, the anti-corrosion treatment layer 14 of the coating type is preferable.

In view of the content of the above description, combination examples of the above-described anti-corrosion treatment of the coating type include (1) the sol of the rare earth element oxide alone, (2) the anionic polymer alone, (3) the cationic polymer alone, (4) the sol of the rare earth element oxide+the anionic polymer (the formation of a composite by laminating), (5) the sol of the rare earth element oxide+the cationic polymer (the formation of a composite by laminating), (6) (the sol of the rare earth element oxide+the anionic polymer: the formation of a composite by laminating)/the cationic polymer (multilayering), (7) (the sol of the rare earth element oxide+the cationic polymer: the formation of a composite by laminating)/the anionic polymer (multilayering). Among these, (1) and (4) to (7) are preferable, (4) to (7) are particularly preferable. In this regard, the present embodiment is not limited to the above combinations. For example, as examples of the selection of anti-corrosion treatment, the cationic polymer is a very preferable material in view of the fact that the cationic polymer has good adhesiveness to a modified polyolefin resin illustrated in the description of the second adhesive layer or the sealant layer described below, and therefore, in a case where the second adhesive layer or the sealant layer is configured with the modified polyolefin resin, it is possible to accomplish a design such that the cationic polymer is disposed on a face in contact with the second adhesive layer or the sealant layer (for example, a configuration such as configurations (5) and (6).

Also, the anti-corrosion treatment layer 14 is not limited to the above-described layers. For example, in a manner analogous to as in chromate of an application type of known technology, it is possible to form the anti-corrosion treatment layer 14 by using a treating agent prepared by mixing phosphoric acid and a chromium compound into a resin binder (such as aminophenol). By means of this treating agent, it is possible to provide a layer with both anti-corrosion function and adhesiveness. Also, although stability of the coating solution has to be taken into consideration, by means of a coating agent in which a sol of a rare earth element oxide and an polycationic polymer or polyanionic polymer have been set to be a one-component in advance, it is possible to provide a layer with both the anti-corrosion function and the adhesiveness.

In either a multilayered structure or a single-layered structure, it is preferable that the mass of the anti-corrosion treatment layer 14 per unit area be 0.005 to 0.200 $g/m^2$, and it is more preferable that this mass be 0.010 to 0.100 $g/m^2$. When the above-described mass per unit area is 0.005 $g/m^2$ or more, it is easy to impart the anti-corrosion function to the metallic foil layer 13. Also, even when the above-described mass per unit area is greater than 0.200 $g/m^2$, the anti-corrosion function does not vary to a significant extent. On the other hand, in a case where the sol of the rare earth element oxide is used, curing by heat in drying is insufficient when the coating is thick, and decrease in aggregation force may occur. Note that the thickness of the anti-corrosion treatment layer 14 can be calculated from the specific gravity thereof.

In view of facilitating to retain the adhesiveness between the sealant layer and the metallic foil layer, preventing the generation of source of bubbling of the electrolytic solution, and facilitating to further suppress the decrease in insulation properties after degassing heat sealing, the anti-corrosion treatment layer 14 can be, for example, such that it includes cerium oxide, 1 to 100 parts by mass of phosphoric acid or a phosphate per 100 parts by mass of the cerium oxide, and a cationic polymer, can be such that it is formed by subjecting the metallic foil layer 13 to the chemical conversion treatment, or can be such that it is formed by subjecting the metallic foil layer 13 to the chemical conversion treatment, and includes a cationic polymer.

<Second Adhesive Layer 17>

The second adhesive layer 17 is a layer adhering the metallic foil layer 13 on which the anti-corrosion treatment layer 14 is formed, to the sealant layer 16. It is possible to use typical adhesive for adhering the metallic foil layer to the sealant layer in the second adhesive layer 17.

When the anti-corrosion treatment layer 14 has a layer including at least one polymer selected from the group consisting of the cationic polymers and the anionic polymers described above, it is preferable that the second adhesive layer 17 be a layer including a compound having reactivity with the above polymers included in the anti-corrosion treatment layer 14 (hereinafter, also referred to as "reactive compound").

For example, when the anti-corrosion treatment layer 14 includes a cationic polymer, the second adhesive layer 17 includes a compound having reactivity with the cationic polymer. When the anti-corrosion treatment layer 14 includes an anionic polymer, the second adhesive layer 17 includes a compound having reactivity with the anionic polymer. Also, when the anti-corrosion treatment layer 14 includes a cationic polymer and an anionic polymer, the second adhesive layer 17 includes a compound having reactivity with the cationic polymer, and a compound having reactivity with the anionic polymer. Here, the second adhesive layer 17 does not necessarily have to include the above two compounds, and may include a compound having reactivity with both the cationic polymer and the anionic polymer. Here, "having reactivity" means to form a covalent bond with a cationic polymer or an anionic polymer. Also, the second adhesive layer 17 can further include an acid-modified polyolefin resin.

Examples of the compound having reactivity with a cationic polymer include at least one compound selected from the group consisting of a multifunctional isocyanate compound, a glycidyl compound, a compound having a carboxy group and a compound having an oxazoline group.

Examples of the multifunctional isocyanate compound, the glycidyl compound, the compound having a carboxy group and the compound having an oxazoline group include the multifunctional isocyanate compound, the glycidyl compound, the compound having a carboxy group and the compound having an oxazoline group illustrated above as a crosslinking agent for imparting a crosslinked structure to a cationic polymer. Among these, the multifunctional isocyanate compound is preferable due to the fact that the multifunctional isocyanate compound has high reactivity with the cationic polymer, and can easily form a crosslinked structure.

Examples of the compound having reactivity with an anionic polymer include at least one compound selected from the group consisting of the glycidyl compound and the compound having an oxazoline group. Examples of the glycidyl compound and the compound having an oxazoline group include the glycidyl compound and the compound having an oxazoline group illustrated above as a crosslinking agent for providing a cationic polymer with a cross-linked structure. Among these, the glycidyl compound is preferable due to the fact that glycidyl compound has high reactivity with the anionic polymers.

When the second adhesive layer 17 includes an acid-modified polyolefin resin, it is preferable that the reactive compound also have reactivity with an acidic group in the acid-modified polyolefin resin (in other words, forms a covalent bond with the acidic group). As a result of this, the adhesiveness to the anti-corrosion treatment layer 14 further increases. In addition, the acid-modified polyolefin resin is set to have a crosslinked structure, and the solvent resistance of the packaging material 10 further enhances.

It is preferable that the content of the reactive compound be from the same equivalents to ten times equivalents in relation to the acidic group in the acid-modified polyolefin resin. At the same equivalents or higher, the reactive compound satisfactorily reacts with the acidic group in the acid-modified polyolefin resin. On the other hand, when greater than the ten times equivalents, the crosslinking reaction with the acid-modified polyolefin resin fully reaches to saturation, and therefore, unreacted materials are present, and decrease in various kinds of performance is concerned. Therefore, bay way of example, it is preferable that the content of the reactive compound be 5 to 20 parts by mass (the ratio by solids content) per 100 parts by mass of the acid-modified polyolefin resin.

The acid-modified polyolefin resin is prepared by introducing an acidic group to a polyolefin resin. Examples of the acidic group include a carboxy group, a sulfonic acid group, and an acid anhydride group, and a maleic acid anhydride group and a (meth)acrylic acid group are particularly preferable. As the acid-modified polyolefin resin, for example, it is possible to use those analogous to that described below as a modified polyolefin resin (a) for use in the first sealant layer 16a.

It is also possible to formulate a variety of additives such as a flame retardant, a slip agent, an anti-blocking agent, an antioxidant, a light stabilizer and a tackifier into the second adhesive layer 17.

In view of suppressing the decrease in laminating strength in the case of involvement of the electrolytic solution, and in view of further suppressing the decrease in insulation properties, the second adhesive layer 17 can include, for example, the acid-modified polyolefin, and at least one curing selected from the group consisting of the multifunctional isocyanate compound, the glycidyl compound, the compound having a carboxy group, the compound having an oxazoline group and a carbodiimide compound. Note that examples of the carbodiimide compound include N,N'-di-o-toluyl carbodiimide, N,N'-diphenyl carbodiimide, N,N'-di-2,6-dimethylphenyl carbodiimide, N,N'-bis(2,6-diisopropylphenyl) carbodiimide, N,N'-dioctyldecyl carbodiimide, N-triyl-N'-cyclohexyl carbodiimide, N,N'-di-2,2-di-t-butylphenyl carbodiimide, N-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, and N,N'-di-p-toluyl carbodiimide.

Also, as the adhesive forming the second adhesive layer 17, it is also possible to use, for example, polyurethane-based adhesive prepared by formulating a polyester polyol consisting of a hydrogenated dimeric fatty acid and a diol, and a polyisocyanate.

In view of achieving a desired adhesive strength, processability and the like, it is preferable for the thickness of the second adhesive layer 17 to be, but not limited in particular, 1 to 10 μm, and it is more preferable for the thickness of the second adhesive layer 17 to be 3 to 7 μm.

<Sealant Layer 16>

The sealant layer 16 is a layer imparting sealability resulting from heat sealing to the packaging material 10. Examples of the sealant layer 16 include sealant layers configured to include an associative organic compound.

When the sealant layer is a single layer as in FIG. 1, the sealant layer is an associative organic compound-containing layer including an associative organic compound.

In the present specification, the associative organic compound is an organic compound having associative functional groups, the associative functional groups being able to associate with each other. Also, the associative functional group means a group that can produce noncovalent intermolecular interaction such as hydrogen bond, electrostatic interaction and van der Waals force between the associative functional groups. For example, in an associative organic compound having amide groups as the associative functional groups, it is possible for each oxygen atom and each hydrogen atom between two amide groups to associate with one another by an intermolecular hydrogen bond. The associative organic compound has two or more associative functional groups and a hydrocarbon group having 4 or more carbon atoms. It is preferable that the associative organic compound have a hydrocarbon group having 4 or more carbon atoms at an end of the molecule. Due to the fact that the associative organic compound has a hydrocarbon group having 4 or more carbon atoms, when the associative organic compound is heated in a step of producing a packaging material, the associative organic compound and a melted sealant resin can be homogeneously dissolved in one another. In addition, due to the fact that the associative organic compound has two or more associative functional groups, when the associative organic compound is cooled, the associative functional groups associate with each other to form a three-dimensional network. In other words, when the associative organic compound is cooled, the associative functional groups associate with each other by noncovalent intermolecular interaction (association), and the associative organic compound grows in a three-dimensional manner and self-assembles and self-organizes to form an associate like a macromolecule (a three-dimensional network). With the progression of the formation of this associate, the phase-separated sealant resin and the three-dimensional network are entangled with each other, and it is possible to increase the melt viscosity of the sealant layer when the associative organic compound is heated again at a temperature that is higher than or equal to the melting point of the sealant resin and that is less than or equal to the melting point of the associative organic compound. As a result of this, it is considered that it is possible to suppress bubbling of the electrolytic solution, and suppress the decrease in insulation properties after degassing heat sealing. The number of the carbon atoms in the above hydrocarbon group that the associative organic compound has is preferably 5 or more, and more preferably 6 or more. Also, the number of the carbon atoms in the above hydrocarbon group can be 20 or less, and it is preferable that the number of the carbon atoms in the linear structured moiety be 11 or less. The associative organic compound may have a plurality of hydrocarbon groups, in this case, the number of the carbon atoms in at least one hydrocarbon group of the plurality of the hydrocarbon groups may be 4 or more. The number of the associative functional groups that the associative organic compound has can be 2 to 5, or 2 to 4. It is possible to identify the structure of the associative organic compound, for example, by analysis such as infrared spectroscopy (IR) or gas chromatography-mass spectroscopy (GC-MS).

The associative organic compound can have an associative functional group at an end in the molecule, and may have the associative functional group as a bond in the molecular chain. Examples of the associative functional group include a hydroxy group, a carboxy group, a carboxamide group, a —NH—C(=O)— bond (amide bond), a —NH—C(=O)O— bond (urethane bond), a —NH—C(=O)—NH— bond, and a —C(=O)—O— bond (ester bond). In view of associating ability, it is preferable that the associative functional group be a group that can produce a hydrogen bond. The hydrocarbon group can be either of a chain hydrocarbon group and a cyclic hydrocarbon group, and can be either of a saturated hydrocarbon group and an unsaturated hydrocarbon group. The cyclic hydrocarbon group may have either of an aliphatic ring and an aromatic ring. Examples of the associative organic compound include sugar alcohol derivatives, amide derivatives, amino acid derivatives, fatty acid derivatives, urea derivatives, cyclohexane derivatives, and cyclic dipeptide derivatives.

The molecular weight of the associative organic compound can be small, and for example, can be 100 to 800 or 150 to 600. It is preferable that the associative organic compound have an asymmetric structure. When the associative organic compound has an asymmetric structure, association of the associative functional groups tends to be inhibited by steric hindrance in a moderate manner. In this case, the associative organic compound grows to become bent at a sterically crowded site, and as a result of this, the three-dimensional network is further easy to obtain.

It is preferable that the associative organic compound be a sugar alcohol derivative, and it is more preferable that the associative organic compound be a sorbitol derivative represented by the following formula (1), or a nonitol derivative represented by the following formula (2). In the following formula (1), $R^1$ to $R^4$ each independently represent a hydrogen atom or a hydrocarbon group having 1 to 6 carbon atoms. Preferably, $R^1$ to $R^4$ each independently represent a hydrogen atom or a hydrocarbon group having 1 to 3 carbon atoms. In the following formula (2), $R^5$ and $R^6$ each independently represent a hydrogen atom or a hydrocarbon group having 1 to 6 carbon atoms. Preferably, $R^5$ and $R^6$ each independently represent a hydrogen atom or a hydrocarbon group having 1 to 3 carbon atoms. By using the above compounds as the associative organic compound, it tends to be able to further suppress the decrease in insulation properties after degassing heat sealing. Both the compounds represented by the following formulae (1) and (2) have two hydroxy groups, and each of these hydroxy groups is to be an associative functional group. Also, the sorbitol derivative represented by the following formula (1) has a hydrocarbon group (having 4 or more carbon atoms) configured with a benzene ring, $R^1$ and $R^2$ (or a benzene ring, $R^3$ and $R^4$), and the nonitol derivative represented by the following formula (2) has a hydrocarbon group (having 4 or more carbon atoms) configured with a benzene ring and $R^5$ (or a benzene ring and $R^6$).

[Chemical Formula 2]

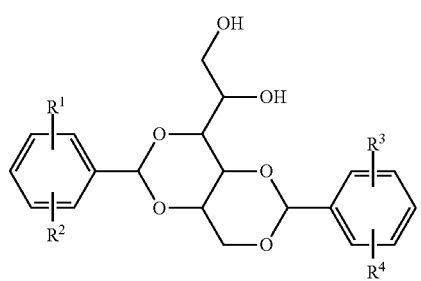

(1)

-continued

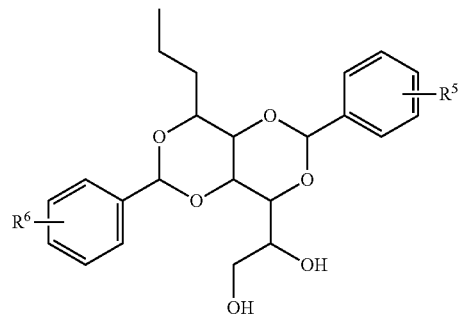

(2)

The associative organic compound-containing layer as the sealant layer 16 may include components other than the above associative organic compounds. The associative organic compound-containing layer as the sealant layer 16 can be configured, for example, with a resin composition as a base component (hereinafter, also referred to as "base resin composition"), and the associative organic compound. Here, the above base resin composition means a component in which the associative organic compound is excluded from all of the constituent components of the sealant layer 16.

When the sealant layer 16 contains a "base resin composition", the content of the "base resin composition" can be, for example, 95.00 to 99.999% by mass, 99.00 to 99.99% by mass, or 99.50 to 99.99% by mass based on the total mass of the sealant layer 16. Also, it is preferable that the content of the associative organic compound be, for example, 0.001 to 5.00% by mass based on the total mass of the sealant layer 16, it is more preferable that this content be 0.01 to 1.00% by mass, and it is further preferable that this content be 0.01 to 0.50% by mass.

When the content of the associative organic compound is 0.001% by mass or more, a three-dimensional network tends to be formed, and the decrease in insulation properties after degassing heat sealing tends to be suppressed. Also, when the content of the associative organic compound is 5.00% by mass or less, it tends to reduce the amount of the associative organic compounds that do not associate with each other, suppress bleeding out thereof, and suppress the inhibition of expression of other properties.

Examples of the "base resin composition" (except for the above associative organic compound) include, but not limited in particular, polyolefins such as polyethylene and polypropylene. Examples of the "base resin composition" include a resin composition (hereinafter, sometimes referred to as "resin composition α") containing (A) 60 to 95% by mass of propylene-ethylene random copolymer, and (B) 5 to 40% by mass of polyolefin-based elastomer of which a comonomer is 1-butene and of which the melting point is 150° C. or less.

[Resin Composition α]

As described above, the resin composition α contains 60 to 95% by mass of the (A) propylene-ethylene random copolymer, and 5 to 40% by mass of the (B) polyolefin-based elastomer of which a comonomer is 1-butene and of which the melting point is 150° C. or less.

((A) Propylene-Ethylene Random Copolymer)

The (A) propylene-ethylene random copolymer has better heat sealability at low temperatures than that of propylene-ethylene block copolymers and propylene homopolymers, and as a result of this, can improve sealing properties in the case of involvement of the electrolytic solution.

In the (A) propylene-ethylene random copolymer, it is preferable that the content of ethylene be 0.1 to 10% by mass, and it is more preferable that the content of ethylene be 1 to 7% by mass, and it is further preferable that the content of ethylene be 2 to 5% by mass. When the content of ethylene is 0.1% by mass or more, the effect of reducing the melting point by copolymerization of ethylene is satisfactorily achieved to enable further improvement in sealing properties in the case of involvement of the electrolytic solution, and in addition, to obtain the impact resistance, and it tends to enable improvement in sealing strength and molding whitening resistance. When the content of ethylene is 10% by mass or less, it tends to enable excessive decrease in melting point to be suppressed, and to enable generation of excessively sealed portions to be suppressed more satisfactorily. Note that the content of ethylene can be calculated from the mixing ratio of the monomers in polymerization.

It is preferable that the melting point of the (A) propylene-ethylene random copolymer be 120 to 145° C., and it is more preferable that the melting point of the (A) propylene-ethylene random copolymer be 125 to 140° C. When this melting point is 120° C. or more, it tends to enable generation of excessively sealed portions to be suppressed more satisfactorily. When the melting point is 145° C. or less, it tends to enable further improvement in sealing properties in the case of involvement of the electrolytic solution.

The (A) propylene-ethylene random copolymer may be acid-modified, and for example, can be an acid-modified propylene-ethylene random copolymer obtained by graft modification with maleic anhydride. By using the acid-modified propylene-ethylene random copolymer, it is possible to retain the adhesiveness to tab leads without a tab sealant.

With regard to the (A) propylene-ethylene random copolymer, it is possible to use one alone, or to use a combination of two or more thereof.

In the resin composition α, it is preferable that the content of the (A) component be 60 to 95% by mass based on the total amount of solids in the resin composition α, it is more preferable that this content be 60 to 90% by mass, and it is further preferable that this content be 60 to 85% by mass. As a result of the fact that the content of the (A) component is 60% by mass or more, it is possible to improve the sealing properties by an effect of using the (A) component by nature. Also, it is possible to prevent excessive presence of the (B) component by setting the content of the (A) component to be 60% by mass or more, and therefore, it is possible to suppress the decrease in heat resistance of the sealant layer 16, and in addition, it is possible to suppress generation of excessively sealed portions. On the other hand, due to the fact that inclusion of 5% by mass or more of the (B) component can be achieved by setting the content of the (A) component to be 95% by mass or less, it is possible to satisfactorily achieve the effect of improving the degassing heat seal strength due to the (B) component.

((B) Polyolefin-Based Elastomer of Which Comonomer is 1-Butene and Which Melting Point is 150° C. or Less)

The (B) polyolefin-based elastomer of which comonomer is 1-butene and which melting point is 150° C. or less contributes to improvement in the sealing properties including degassing heat seal strength and in the case of involvement of the electrolytic solution, and in addition, contributes to suppression of generation of molding whitening.

The (B) polyolefin-based elastomer can be one having compatibility with the (A) component or one not having compatibility with the (A) component; however, it is preferable that the (B) polyolefin-based elastomer include both a (B-1) compatible polyolefin-based elastomer having compatibility, and a (B-2) incompatible polyolefin-based elastomer not having compatibility. Here, in a case where the resin constituting the (A) component is a propylene-ethylene random copolymer, having compatibility with the (A) component (compatible) means to provide dispersion in the propylene-ethylene random copolymer resin constituting the (A) component with a disperse phase size of 1 nm or more and less than 500 nm. Not having compatibility (incompatible) means to provide dispersion in a propylene-ethylene random copolymer resin constituting the (A) component with a disperse phase size of 500 nm or more and less than 20 μm.

Examples of the (B-1) compatible polyolefin-based elastomer include a propylene-1-butene random copolymer.

Examples of the (B-2) incompatible polyolefin-based elastomer include an ethylene-1-butene random copolymer.

Although the melting point of the (B) polyolefin-based elastomer has to be 150° C. or less, in view of suppressing the excessively sealed portions, suppressing the molding whitening, and improving the sealing properties in the case of involvement of the electrolytic solution, it is preferable that the melting point of the (B) polyolefin based elastomer be 60 to 120° C., and it is more preferable that this melting point be 65 to 90° C. As a result of the fact that this melting point is 150° C. or less, it is possible to improve the sealing properties in the case of involvement of the electrolytic solution, in particular, the degassing heat seal strength. Also, when this melting point is 60° C. or more, it is advantageous in view of suppressing the generation of the excessively sealed portions.

With regard to (B) polyolefin-based elastomer, it is possible to use one alone, or to use a combination of two or more thereof.

In the resin composition α, it is preferable that the content of the (B) component be 5 to 40% by mass based on the total amount of solids in the resin composition α, it is more preferable that this content be 10 to 40% by mass, and it is further preferable that this content be 15 to 40% by mass. Due to the fact that the content of the (B) component is 5% by mass or more, it is possible to satisfactorily achieve the effect of improving the sealing properties in the case of involvement of the electrolytic solution, in particular, the degassing heat seal strength. On the other hand, by setting the content of the (B) component to be 40% by mass or less, it is possible to suppress the decrease in heat resistance of the sealant layer 16, and in addition, suppress the generation of the excessively sealed portions.

When the (B) component includes the (B-1) compatible polyolefin-based elastomer and the (B-2) incompatible polyolefin-based elastomer, it is preferable that the ratio of both the contents ((B-1) compatible polyolefin-based elastomer/(B-2) incompatible polyolefin-based elastomer) be 0.5 to 3 based on the mass ratio, and it is more preferable that the ratio of the contents be 1 to 2. By setting the ratio of the contents to be in the above range, it is possible to improve the molding whitening resistance and the sealing properties in the case of involvement of the electrolytic solution in a well-balanced manner.

(Components to be Added)

The resin composition α can further include other components other than the (A) component and the (B) component described above. As the other components other than the (A) component and the (B) component, it is possible to add, for example, other resins such as LDPE (low density polyethylene) in order to improve take-up easiness and processability. It is preferable that the content of the other resin components to be added be 10 parts by mass or less when the total mass of the sealant layer 16 is regarded as 100 parts by mass. Also, examples of components other than resins include slip agents, anti-blocking agents, antioxidants, light stabilizers, and flame retardants. It is preferable that the content of the other component other than resins be 5 parts by mass or less when the total mass of the sealant layer 16 is regarded as 100 parts by mass.

In the sealant layer 16, it is possible to identify the presence of 1-butene by attribution using FT-IR (Fourier transform infrared spectrophotometer). Also, it is possible to identify the content of 1-butene by producing a calibration curve with regard to transmittance or absorbance in characteristic absorption bands of the (A) component and the (B) component by using a resin composition α in which a known amount of elastomer including a known amount of 1-butene is mixed. In addition, it is possible to identify the content of 1-butene in each of the (B-1) compatible polyolefin-based elastomer and the (B-2) incompatible polyolefin-based elastomer by conducting imaging also in characteristic absorption band of FT-IR, and conducting the mapping of absorption band resulted from 1-butene by using microscopic FT-IR (transmission method). Note that in addition to FT-IR, it is possible to identify the presence and the content of 1-butene by measuring the sealant layer 16 by NMR.

Although the thickness of the sealant layer 16 is not limited in particular, it is preferable that the thickness of the sealant layer 16 be, for example, in a range of 5 to 100 μm, and it is more preferable that the thickness of the sealant layer 16 be in a range of 20 to 80 μm. Also, the thickness of the sealant layer 16 may be 30 μm or less in view of thinning Even in such a thin film configuration, the packaging material for a power storage device of the present embodiment can suppress the decrease in insulation properties after heat sealing, molding and degassing heat sealing.

Although preferable embodiments of the packaging material for a power storage device of the present embodiment have been described above in detail, the present invention is not limited to such certain embodiments, and a variety of variations and modifications can be made within the scope of the present invention defined in the claims.

For example, FIG. 1 shows a case where an anti-corrosion treatment layer 14 is formed on a face on the side of a second adhesive layer 17 of a metallic foil layer 13; however, the anti-corrosion treatment layer 14 may be formed on a face on the side of a first adhesive layer 12 of the metallic foil layer 13, or may be formed on both faces of the metallic foil layer 13. In a case where the anti-corrosion treatment layer 14 is formed on both faces of the metallic foil layer 13, a configuration for the anti-corrosion treatment layer 14 to be formed on the side of the first adhesive layer 12 of the metallic foil layer 13, and a configuration for the anti-corrosion treatment layer 14 to be formed on the side of the second adhesive layer 17 of the metallic foil layer 13 may be the same as or different than each other.

Figure 2:
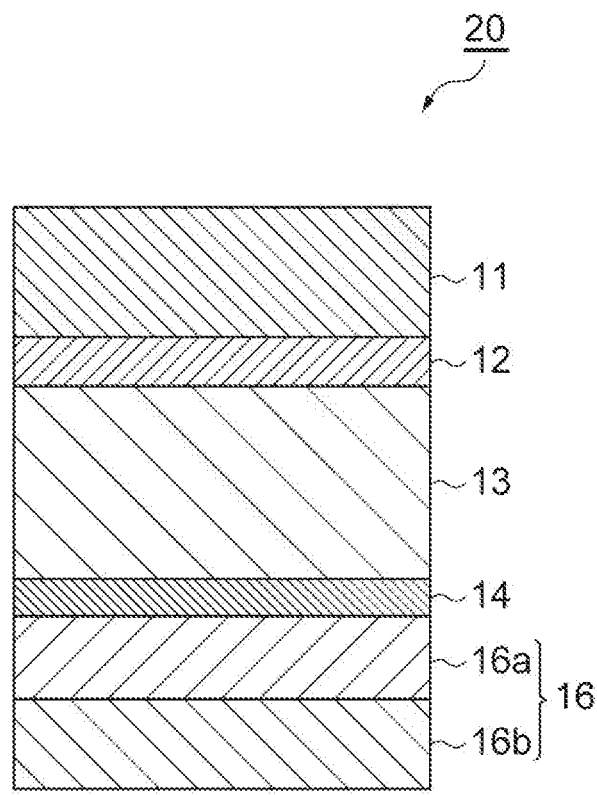
FIG. 2 is a schematic cross-sectional view of a packaging material for a power storage device according to one embodiment of the present invention.
Figure 3:
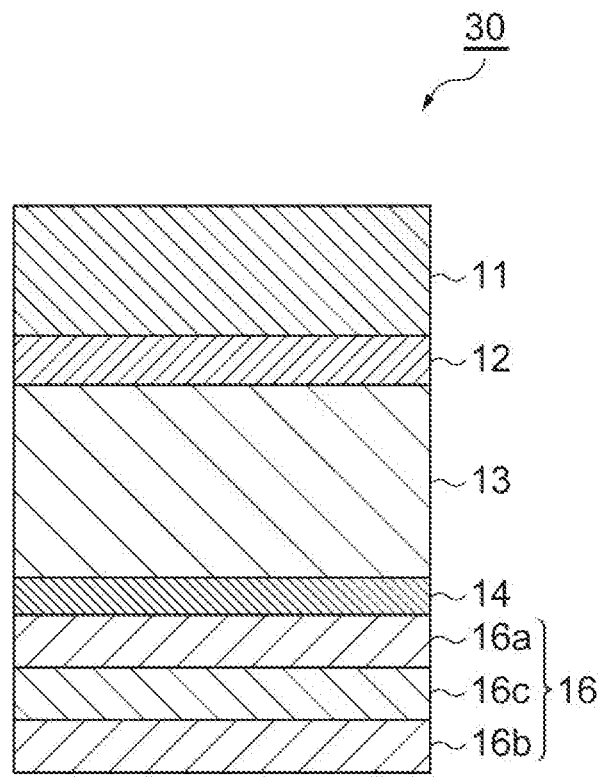
FIG. 3 is a schematic cross-sectional view of a packaging material for a power storage device according to one embodiment of the present invention.

Although FIG. 1 shows a case where the metallic foil layer 13 and the sealant layer 16 are laminated by use of the second adhesive layer 17, the sealant layer 16 may be directly formed on the metallic foil layer 13 without interposition of the second adhesive layer 17, as in a packaging material for a power storage device 20 shown in FIG. 2 and as in a packaging material for a power storage device 30 shown in FIG. 3. On the other hand, the packaging material for a power storage device 20 shown in FIG. 2 and the packaging material for a power storage device 30 shown in FIG. 3 may comprise a second adhesive layer 17 between the metallic foil layer 13 and the sealant layer 16.

Although FIG. 1 shows a case where the sealant layer 16 is formed of a single layer, the sealant layer 16 may be formed of multiple layers of two or more layers, as in the packaging material for a power storage device 20 shown in FIG. 2 and as in the packaging material for a power storage device 30 shown in FIG. 3. Configuration of each layer of the multiple layers forming the sealant layer 16 can be the same as or different than each other. Note that, when the sealant layer 16 is multilayered, at least one layer of the multiple layers of the sealant layer 16 is an associative organic compound-containing layer in which an associative organic compound is included.

In the packaging material for a power storage device 20 shown in FIG. 2, the sealant layer 16 is configured with a first sealant layer 16a and a second sealant layer 16b. Here, the first sealant layer 16a is the outermost layer of the sealant layer, and the second sealant layer 16b is the innermost layer of the sealant layer. At least one layer selected from the group consisting of the first sealant layer 16a and the second sealant layer 16b is an associative organic compound-containing layer including the above associative organic compound.

It is possible to form the second sealant layer 16b (the innermost layer), for example, by using constituent components as in the sealant layer 16 in the above-described packaging material 10. When the second sealant layer 16b is an associative organic compound-containing layer, decrease in insulation properties tends to be suppressed with maintaining the laminating strength in the case of involvement of the electrolytic solution.

Also, it is possible to form the second sealant layer 16b by using the material in which the associative organic compound is removed from the material forming the sealant layer 16 in the above-described packaging material 10.

Although the thickness of the second sealant layer 16b is not limited in particular, it is preferable that the thickness of the second sealant layer 16b be specifically in a range of 5 to 100 μm, for example, and the thickness can be in a range of 10 to 30 μm in view of thinning.

The first sealant layer 16a (the outermost layer, the layer on the side of the metallic foil) may be formed, for example, by using constituent components analogous to as in the second sealant layer 16b; however, in the first sealant layer 16a, for example, instead of the resin composition α as a base resin composition, it is preferable to use a resin composition including an adhesive resin composition as a main component, and where appropriate, an additive component (hereinafter, sometimes referred to as "resin composition β"), in view of aluminum treatment and adhesiveness. In other words, the first sealant layer 16a can be formed, for example, of the associative organic compound and the resin composition β, or can be formed only of the resin composition β. When the first sealant layer 16a contains the adhesive resin composition, it is possible to form the sealant layer on the metallic foil layer without interposition of the adhesive layer. In the case where the first sealant layer 16a is formed of the associative organic compound and the resin composition β, it tends to facilitate to retain the adherence between the sealant layer and the metallic foil layer, prevent the generation of source of bubbling of the electrolytic solution, and further suppress the decrease in insulation properties after degassing heat sealing.

[Resin Composition 13 (Other Than the Above Associative Organic Compounds)]

Although the adhesive resin composition with regard to the resin composition β is not limited in particular, it is preferable that the adhesive resin composition with regard to the resin composition β contain a modified polyolefin resin (a) component and a macro-phase separated thermoplastic elastomer (b) component. Also, it is preferable that the additive component include polypropylene with an atactic structure, or propylene-α-olefin copolymer with an atactic structure (c). Each of these components will be described below.

(Modified Polyolefin Resin (a))

It is preferable that the modified polyolefin resin (a) be a resin in which an unsaturated carboxylic acid derivative component derived from any of an unsaturated carboxylic acid, an acid anhydride of an unsaturated carboxylic acid and an ester of an unsaturated carboxylic acid is graft-modified to a polyolefin resin.

Examples of the polyolefin resin include polyolefin resins such as low density polyethylene, medium density polyethylene, high density polyethylene, an ethylene-α-olefin copolymer, a homo-, block or random polypropylene, and a propylene-α-olefin copolymer.

Examples of a compound for use in graft modification of these polyolefin resins include an unsaturated carboxylic acid derivative component derived from any of an unsaturated carboxylic acid, an acid anhydride of an unsaturated carboxylic acid, and ester of an unsaturated carboxylic acid.

Specific examples of the unsaturated carboxylic acid include acrylic acid, methacrylic acid, maleic acid, fumaric acid, itaconic acid, citraconic acid, tetrahydrophthalic acid, and bicyclo[2,2,1]hept-2-en-5,6-dicarboxylic acid.

Examples of the acid anhydride of the unsaturated carboxylic acid include acid anhydride of an unsaturated carboxylic acid such as maleic anhydride, itaconic anhydride, citraconic anhydride, tetrahydrophthalic anhydride, and bicyclo[2,2,1]hept-2-en-5,6-dicarboxylic anhydride.

Examples of the ester of the unsaturated carboxylic acid include ester of an unsaturated carboxylic acid such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate anhydride, and dimethyl bicyclo[2,2,1]hept-2-en-5,6-dicarboxylate.

The modified polyolefin resin (a) can be produced by subjecting 0.2 to 100 parts by mass of the unsaturated carboxylic acid derivative component described above per 100 parts by mass of the polyolefin resin as a base component to graft polymerization (graft modification) under the presence of a radical initiator. It is preferable that the reaction temperature of the graft modification be 50 to 250° C., and it is more preferable that it be 60 to 200° C. Also, the reaction time is appropriately set depending on the production method, and for example, in a case of melt graft polymerization by a twin-screw extruder, it is preferable that the reaction time be within the residence time in the extruder, and specifically 2 to 30 minutes, and it is more preferable that the reaction time be 5 to 10 minutes. Note that the graft modification can be conducted under conditions of either normal pressure or with pressurization.

Examples of the radical initiator for use in the graft modification include organic peroxide such as alkyl peroxide, aryl peroxide, acyl peroxide, ketone peroxide, peroxyketal, peroxycarbonate, peroxyester, and hydroperoxide.

It is possible to appropriately select and use the organic peroxide depending on conditions with regard to the reaction temperature and the reaction time described above. For example, in a case of melt graft polymerization with a twin-screw extruder, alkyl peroxide, peroxyketal, and peroxyester are preferable, and specifically, di-t-butyl peroxide, 2,5-dimethyl-2,5-di-t-butylperoxy-hexin-3, dicumyl peroxide and the like are preferable.

As the modified polyolefin resin (a), polyolefin resins modified with maleic anhydride are preferable, and for example, "ADMER" manufactured by Mitsui Chemicals Inc. and "MODIC" manufactured by Mitsubishi Chemical Corporation and the like are suitable. Such a modified polyolefin resin (a) component has good reactivity with polymers having a variety of metals and a variety of functional groups, and it is therefore possible to impart the adhesiveness to the first sealant layer 16a using this reactivity, and to improve the electrolytic solution resistance.

(Macro-Phase Separated Thermoplastic Elastomer (b))

The macro-phase separated thermoplastic elastomer (b) forms a macro-phase separated structure in which the disperse phase size is in a range of greater than 200 nm and less than or equal to 50 μm in relation to the modified polyolefin resin (a).

Due to the fact that the adhesive resin composition contains the macro-phase separated thermoplastic elastomer (b) component, it is possible to release residual stress generated when laminating the modified polyolefin resin (a) component that can be a main component constituting the first sealant layer 16a, and it is possible to impart the viscoelastic adhesiveness to the first sealant layer 16a. As a result of this, the adhesiveness of the first sealant layer 16a further enhances to obtain a packaging material 20 having better electrolytic solution resistance.

The macro-phase separated thermoplastic elastomer (b) is present in the form of a sea-island structure in the modified polyolefin resin (a); however, when the disperse phase size is 200 nm or less, it is difficult to impart the improvement in viscoelastic adhesiveness. On the other hand, when the disperse phase size is greater than 50 μm, since the modified polyolefin resin (a) and the macro-phase separated thermoplastic elastomer (b) are essentially incompatible with each other, the laminating suitability (processability) significantly decreases, and in addition, the physical strength of the first sealant layer 16a tends to decrease. In view of the above-mentioned facts, it is preferable that the disperse phase size be 500 nm to 10 μm.

Examples of such a macro-phase separated thermoplastic elastomer (b) include a polyolefin-based thermoplastic elastomer in which ethylene and/or propylene are copolymerized with an α-olefin selected from 1-butene, 1-pentene, 1-hexene, 1-octene and 4-methyl-1-pentene.

Also, as the macro-phase separated thermoplastic elastomer (b) component, it is possible to use commercially available products, and for example, "TAFMER" manufactured by Mitsui Chemicals Inc., "ZELAS" manufactured by Mitsubishi Chemical Corporation, "Catalloy" manufactured by Montell and the like are suitable.

In the above resin composition β, it is preferable for the content of the macro-phase separated thermoplastic elastomer (b) component to the modified polyolefin resin (a) component to be 1 to 40 parts by mass per 100 parts by mass of the modified polyolefin resin (a) component, and it is more preferable for this content to be 5 to 30 parts by mass. Here, when the content of the macro-phase separated thermoplastic elastomer (b) component is less than 1 part by mass, the adhesiveness of the first sealant layer is not expected to enhance. On the other hand, when the content of the macro-phase separated thermoplastic elastomer (b) component is greater than 40 parts by mass, the modified polyolefin resin (a) component and the macro-phase separated thermoplastic elastomer (b) component have low compatibility with each other by nature, and therefore, the processability tends to decrease significantly. Also, the macro-phase separated thermoplastic elastomer (b) component is not a resin exhibiting adhesiveness, and therefore, the adhesiveness of the first sealant layer 16a to other layers such as the second sealant layer 16b and the anti-corrosion treatment layer 14 tends to decrease.

(Polypropylene with Atactic Structure or Propylene-α-Olefin Copolymer with Atactic Structure (c))

It is preferable that the above resin composition β include polypropylene with an atactic structure or a propylene-α-olefin copolymer with an atactic structure (hereinafter, merely referred to as "component (c)") as an additive component. Here, the component (c) is a fully amorphous resin component.

Hereinafter, an effect of adding the additive component (c) to an adhesive resin composition as a main component in the above resin composition β will be described.

The component (c) in a melted state is compatible with the modified polyolefin resin (a) component in the adhesive resin composition; however, the component (c) is discharged out of the crystal during crystallization involved in cooling, is homogeneously dispersed around spherulites. As a result of this, the component (c) does not disturb the degree of crystallinity of the modified polyolefin resin (a) component in the adhesive resin composition as a main component. Also, by adding the component (c) in the above resin composition β, the concentration of the modified polyolefin resin (a) component is reduced by dilution due to the component (c) to suppress the crystal growth, and as a result of this, it is possible to reduce the crystal size (spherulite size) of the adhesive component of the base resin (in other words, the modified polyolefin resin (a) component). Also, the component (c) discharged out of the crystal is homogeneously dispersed around minute spherulites of the modified polyolefin resin (a) component.

Here, it is conventionally known that "whitening phenomenon" generates in cold molding of packaging materials. Here, the mechanism of whitening phenomenon will be illustrated.

(1) As a result of heat treatment in heat lamination, the modified polyolefin resin (a) in the resin composition β is crystallized.
(2) The modified polyolefin resin (a) and the macro-phase separated thermoplastic elastomer (b) are incompatible with each other, and as a result of this, strain occurs at the interface between the both by behavior of the crystallization in (1).
(3) Due to the application of stress in molding, cracks occur at the interface between the both, and as a result of this, voids and crazes are formed.
(4) Light is scattered due to voids and crazes to occur whitening phenomenon by irregular reflection of optical light.

In other words, it is known that "the fact that the crystallization of the modified polyolefin resin (a) is not to proceed by heat quantity provided in heat lamination (in other words, the fact that the crystallization tends not to occur)", and "the fact that the adhesiveness between the modified polyolefin resin (a) and the macro-phase separated thermoplastic elastomer (b) is to be improved" are important in order to suppress the whitening phenomenon.

By contrast to this, it is possible to reduce the crystal size (spherulite size) of the modified polyolefin resin (a) component by adding the component (c) as an additive component to the adhesive resin composition that can be a main component of the first sealant layer 16a, and as a result of this, properties of flexible and tough film are achieved. Also, it is considered that, as a result of the fact that the component (c) is homogeneously dispersed around the modified polyolefin resin (a), it is possible to relax stress homogeneously, and suppress the generation of voids and crazes, and it is therefore possible to reduce the "whitening phenomenon" of the packaging material 20 due to stress in molding.

As described above, by adding the component (c) as an additive component to the adhesive resin composition that can be a main component of the first sealant layer 16a, it is possible to increase the transparency of the first sealant layer 16a, and in addition, to reduce the whitening phenomenon due to stress in molding. As a result of this, the molding whitening is also improved to enable improvement in insulation properties (flex resistance) due to bending stress of the packaging material 20. Also, this enables the impartment of flexibility with retaining the degree of crystallinity of the modified polyolefin resin component (a) in the first sealant layer 16a, and it is therefore possible to suppress the decrease in laminating strength during swelling of the electrolytic solution of the packaging material 20.

(Propylene-α-Olefin Copolymer (d) of Isotactic Structure)

In addition to the above-described component (c), the resin composition β can further include a propylene-α-olefin copolymer of isotactic structure (hereinafter, merely referred to as "component (d)") as an additive component.

By further adding the component (d) as an additive component to the adhesive resin component as a main component of the resin composition β, it is possible to impart flexibility for relaxing stress, and as a result of this, it is possible to improve the heat seal strength (in particular, the electrolytic solution resistance), and improve heat seal, molding and degassing heat seal strength with suppressing the decrease in electrolytic solution laminating strength. Also, by combining the component (c) and the component (d) as additive components, it is possible to further improve the whitening phenomenon and the flex resistance insulation properties.

In the resin composition β, the total mass of the component (a) and the component (b) can be, for example, 60% by mass or more and 95% by mass or less, or 80% by mass or more and 90% by mass or less based on the total mass of the first sealant layer 16a.

In the resin composition β, it is preferable that the total mass of the component (c) and the component (d) be, for example, 5% by mass or more and 40% by mass or less based on the total mass of the component (a), the component (b), the component (c) and the component (d). When the total mass of the component (c) and the component (d) is less than 5% by mass based on the total mass of the component (a), the component (b), the component (c) and the component (d), effects due to the addition of the additives as described above tend not to be obtained satisfactorily. On the other hand, when the total mass of the component (c) and the component (d) is greater than 40% by mass based on the total mass of the component (a), the component (b), the component (c) and the component (d), the adhesiveness of the first sealant layer 16a to other layers such as the second sealant layer 16b and the anti-corrosion treatment layer 14 tends to decrease. Taking these viewpoints into consideration, it is preferable that the total mass of the component (a) and the component (b) in the resin composition β be, for example, 60 to 95% by mass based on the total mass of the component (a), the component (b), the component (c) and the component (d).

Note that, as a method for analyzing the component (c) as an additive component in the resin composition β, for example, it is possible to conduct quantification by evaluation of tacticity by nuclear magnetic resonance spectroscopy (NMR).

On the other hand, with regard to analysis of the component (d), it is possible to produce a calibration curve with the absorption band attributed to the branching of α-olefin, and the absorption band attributed to the characteristic absorption band of the modified polyolefin resin (a) by means of Fourier transform infrared spectroscopy (FT-IR), and as a result of this, it is possible to identify the mixing ratio.

In addition to the adhesive resin composition (in other words, the modified polyolefin resin (a) component and the macro-phase separated thermoplastic elastomer (b) component) and the additive components (in other words, the component (c) and the component (d)), the resin composition β can contain a variety of additives such as flame retardants, slip agents, anti-blocking agents, antioxidants, light stabilizers and tackifiers, where appropriate.

The thickness of the first sealant layer 16a is not limited in particular; however, in view of relaxation of stress and in view of permeation of moisture and electrolytic solution, it is preferable that the thickness of the first sealant layer 16a be equal to that of the second sealant layer 16b (for example, 5 to 100 μm or 10 to 30 μm) or less than that of the second sealant layer 16b.

Also in the packaging material for a power storage device 20, in view of thinning, the thickness of the sealant layer 16 (the total thickness of the first sealant layer 16a and the second sealant layer 16b) can be 35 μm or less, or can be 30 μm or less. Even in such a thin film configuration, the packaging material for a power storage device of the present embodiment can suppress the decrease in insulation properties after heat sealing, molding and degassing heat sealing.

FIG. 2 shows a case where the sealant layer 16 is formed of two layers; however, the sealant layer 16 may be formed of three layers as in the packaging material for a power storage device 30 shown in FIG. 3. In the packaging material for a power storage device 30 shown in FIG. 3, the sealant layer 16 is configured with a first sealant layer 16a, a second sealant layer 16b, and a third sealant layer 16c. Here, the first sealant layer 16a is the outermost layer (the layer on the side of the metallic foil) of the sealant layer, and the third sealant layer 16c is an intermediate layer of the sealant layer, and the second sealant layer 16b is the innermost layer of the sealant layer. At least one layer selected from the group consisting of these three layers is an associative organic compound-containing layer including the above associative organic compound.

Examples and preferable embodiments with regard to materials constituting the first sealant layer 16a of the packaging material for a power storage device 30 are analogous to those with regard to the first sealant layer 16a of the packaging material for a power storage device 20.

Examples and preferable embodiments with regard to materials constituting the second sealant layer 16b and the third sealant layer 16c of the packaging material for a power storage device 30 are analogous to those with regard to the second sealant layer 16b of the packaging material for a power storage device 20.

In the packaging material for a power storage device 30, the thickness of the first sealant layer 16a can be, for example, 2 to 30 μm, 5 to 20 μm, or 8 to 10 μm, the thickness of the second sealant layer 16b can be, for example, 10 to 80 μm, 13 to 40 μm, or 15 to 20 μm, and the thickness of the third sealant layer 16c can be, for example, 2 to 30 μm, 5 to 20 μm, or 8 to 10 μm.

Also in the packaging material for a power storage device 30, in view of thinning, the thickness of the sealant layer 16 (the total thickness of the first sealant layer 16a, the second sealant layer 16b, and third sealant layer 16c) can be 30 μm or less. Even in such a thin film configuration, the packaging material for a power storage device of the present embodiment can suppress the decrease in insulation properties after heat sealing, molding and degassing heat sealing.

When the sealant layer consists of a plurality of layers as in the packaging materials for the power storage device 20, 30, it is preferable that the first sealant layer 16a closest to the metallic foil layer 13 be an associative organic compound-containing layer. Due to the fact that the first sealant layer 16a is an associative organic compound-containing layer, destruction of the sealant layer due to swelling and bubbling of the electrolytic solution is facilitated to be suppressed, and in addition, it is possible for the vicinity of the metallic foil layer 13 being exposed to allow the metallic foil layer 13 to contact the electrolytic solution to be suppressed over a long period of time, and as a result of this, it is possible to suppress the decrease in insulation properties more efficiently. When the first sealant layer 16a is an associative organic compound-containing layer, the content of the resin composition β in the first sealant layer 16a can be, for example, 95.00 to 99.999% by mass, 99.00 to 99.99% by mass, or 99.50 to 99.99% by mass based on the total mass of the first sealant layer 16a. Also, the content of the associative organic compound can be, for example, 0.001 to 5.00% by mass, 0.01 to 1.00% by mass, or 0.01 to 0.50% by mass based on the total mass of the first sealant layer 16a.

When the content of the associative organic compound in the first sealant layer 16a is 0.001% by mass or more, it is possible to suppress the decrease in insulation properties more efficiently. Also, when the content of the associative organic compound is 5.00% by mass or less, it tends to reduce the amount of the associative organic compounds that do not associate with each other, suppress the bleeding out thereof, and suppress the inhibition of expression of other properties.

Also, the second sealant layer 16b or the third sealant layer 16c may be an associative organic compound-containing layer. Due to the fact that the second sealant layer 16b or the third sealant layer 16c is an associative organic compound-containing layer, the decrease in insulation properties tends to be suppressed with maintaining the laminating strength in the case with in the case of involvement of the electrolytic solution. When the second sealant layer 16b is an associative organic compound-containing layer, the content of the associative organic compound in the second sealant layer 16b can be, for example, 0.001 to 5.00% by mass, 0.01 to 1.00% by mass, or 0.10 to 0.50% by mass based on the total mass of the second sealant layer 16b.

When the content of the associative organic compound in the second sealant layer 16b is 0.001% by mass or more, it is possible to suppress the decrease in insulation properties more efficiently. Also, when the content of the associative organic compound is 5.00% by mass or less, it tends to reduce the amount of the associative organic compounds that do not associate with each other, suppress the bleeding out thereof, and suppress the inhibition of expression of other properties.

The content of the associative organic compound in the third sealant layer 16c can be, for example, 0.001 to 5.00% by mass, 0.01 to 1.00% by mass, or 0.10 to 0.50% by mass based on the total mass of the third sealant layer 16c, from a viewpoint analogous to that in second sealant layer 16b.

Also in both the case where the sealant layer consists of a single layer, and the case where the sealant layer consists of a plurality of layers, it is preferable that the content of the above associative organic compound in the sealant layer be, for example, 0.001 to 5.00% by mass based on the total mass of the sealant layer in view of suppressing the decrease in insulation properties after degassing heat sealing with maintaining other properties, and it is more preferable that this content be 0.01 to 1.00% by mass, and it is further preferable that this content be 0.01 to 0.50% by mass.

[Method for Producing Packaging Material]

Next, one example of a method for producing the packaging material 10 shown in FIG. 1 will be illustrated. Note that the method for producing the packaging material 10 is not limited to the following method.

A method for producing the packaging material 10 of the present embodiment is generally configured by comprising a step of laminating the anti-corrosion treatment layer 14 on the metallic foil layer 13, a step of bonding the substrate layer 11 and the metallic foil layer 13, a step of further laminating the sealant layer 16 with the interposition of the second adhesive layer 17 to produce a laminate, and where appropriate, a step of subjecting the obtained laminate to aging treatment.

(Step of Laminating Anti-Corrosion Treatment Layer 14 on Metallic Foil Layer 13)

The present step is a step of forming the anti-corrosion treatment layer 14 on the metallic foil layer 13. Examples of the method for this step include methods of, subjecting the metallic foil layer 13 to degreasing treatment, hydrothermal metamorphism treatment, positive electrode oxidizing treatment, or chemical conversion treatment, or methods of applying a coating agent having anti-corrosion performance to the metallic foil layer 13, as described above.

Also, when the anti-corrosion treatment layer 14 is multilayered, for example, it is possible to apply a coating solution (coating agent) constituting an anti-corrosion treatment layer on the side of the lower layer (on the side of the metallic foil layer 13) to the metallic foil layer 13, followed by burning to form a first layer, and subsequently, applying a coating solution (coating agent) constituting an anti-corrosion treatment layer on the side of the upper layer to the first layer, followed by burning to form a second layer.

It is possible to conduct the degreasing treatment by a spraying process or a dipping process, and it is possible to conduct the hydrothermal metamorphism treatment and the positive electrode oxidizing treatment by a dipping process, and it is possible to conduct the chemical conversion treatment, depending on the type of the chemical conversion treatment, by appropriately selecting a dipping process, a spraying process, coating process, or the like.

With regard to the coating process of the coating agent having anti-corrosion performance, it is possible to use a variety of methods such as gravure coating, reverse coating, roll coating, and bar coating.

As described above, a variety of treatment can be conducted on both faces or one face of the metallic foil; however, in the case where the treatment is conducted on one face of the metallic foil, with regard to the face to be treated, it is preferable to conduct the treatment on the side to which the second adhesive layer 17 is to be laminated. Note that, where appropriate, it is also possible to conduct the above treatment on a surface of the substrate layer 11.

Also, it is preferable for each of the amounts of the coating agent for forming the first and second layers to be 0.005 to 0.200 g/m$^2$, and it is more preferable for each of the amounts to be 0.010 to 0.100 g/m$^2$.

Also, when dry curing is needed, depending on the drying conditions with regard to the anti-corrosion treatment layer 14 to be used, it is possible to conduct dry curing with the temperature of the base material in a range of 60 to 300° C.

(Step of Bonding Substrate Layer 11 with Metallic Foil Layer 13)

The present step is a step of bonding the metallic foil layer 13 on which the anti-corrosion treatment layer 14 is disposed, and the substrate layer 11 with the interposition of the first adhesive layer 12. With regard to the bonding method, the metallic foil layer 13 and the substrate layer 11 are bonded by means of the materials constituting the above-described first adhesive layer 12 using approaches such as dry lamination, non-solvent lamination and wet lamination. The first adhesive layer 12 is provided to be in a range of 1 to 10 g/m$^2$, more preferably in a range of 3 to 7 g/m$^2$ on the basis of the amount for dry application.

(Step of Laminating Second adhesive Layer 17 and Sealant Layer 16)

The present step is a step of bonding the sealant layer 16 to the side of the anti-corrosion treatment layer 14 of the metallic foil layer 13 with the interposition of the second adhesive layer 17. Examples of the method for this bonding include a wet process, and dry lamination.

In the case of the wet process, a solution or dispersion of the adhesive constituting the second adhesive layer 17 is coated on the anti-corrosion treatment layer 14, and the solvent is evaporated at a predetermined temperature (in a case where the adhesive includes an acid-modified polyolefin resin, at a temperature equal to or higher than the melting point of the acid-modified polyolefin resin), and drying and film forming are conducted, or where appropriate, burning treatments is conducted after drying and film forming Next, the sealant layers 16 are laminated to produce the packaging material 10. Examples of the coating method include a variety of coating methods illustrated above.

(Step of Aging Treatment)

The present step is a step of subjecting the laminate to aging (curing) treatment. By subjecting the laminate to aging treatment, it is possible to promote adhesion between the metallic foil layer 13/the anti-corrosion treatment layer 14/the second adhesive layer 17/the sealant layer 16. The aging treatment can be conducted in a range of room temperature to 100° C. The aging time is, for example, 1 to 10 days. Also, in order to provide the adhesion between the second adhesive layer 17/the sealant layer 16, it is possible to conduct heat treatment at a temperature equal to or higher than the melting point of the second adhesive layer 17. Examples of the heat treatment include, but are not limited to, approaches such as heating by an oven, sandwiching by a heated roll (heat lamination), wrapping around a heated roll.

In this way, it is possible to produce the packaging material 10 of the present embodiment as shown in FIG. 1.

Next, one example of a method for producing the packaging material 20 shown in FIG. 2 will be illustrated. Note that the method for producing the packaging material 20 is not limited to the following method.

A method for producing the packaging material 20 of the present embodiment is generally configured by comprising a step of laminating the anti-corrosion treatment layer 14 on the metallic foil layer 13, a step of bonding the substrate layer 11 and the metallic foil layer 13, a step of further laminating the first sealant layer 16a and the second sealant layer 16b to produce a laminate, and where appropriate, a step of subjecting the obtained laminate to heat treatment. Note that it is possible to conduct the steps up to the step of bonding the substrate layer 11 and the metallic foil layer 13, in a manner analogous to as in the method for producing the above-described packaging material 10.

(Step of Laminating First Sealant Layer 16a and Second Sealant Layer 16b)

The present step is a step of forming the first sealant layer 16a and the second sealant layer 16b on the anti-corrosion treatment layer 14 formed by the previous step. Examples of the method for this step include a method for subjecting the first sealant layer 16a to sandwich lamination together with the second sealant layer 16b by use of an extrusion laminating machine. In addition, this laminating can be conducted by a tandem laminating process for extruding the first sealant layer 16a and the second sealant layer 16b, or by an coextrusion process. The resin composition for forming the first sealant layer 16a and the resin composition for forming the second sealant layer 16b can be prepared, for example, by mixing the components so as to satisfy the configuration of the first sealant layer 16a and the second sealant layer 16b described above. Depending on the type of the resin and the associative organic compound constituting the sealant layer, the associative organic compound is dissolved, together with the resin, in one another, for example, by heating in the above-described step of laminating the sealant layer, and when the associative organic compound is cooled, the associative organic compound can form a three-dimensional network.

By means of the present step, a laminate in which each of the layers in order of the substrate layer 11/the first adhesive layer 12/the metallic foil layer 13/the anti-corrosion treatment layer 14/the first sealant layer 16a/the second sealant layer 16b is laminated as shown in FIG. 2 is obtained.

Note that the first sealant layer 16a can be obtained by directly laminating materials that have been dry-blended with an extrusion laminating machine so as to achieve the mixing composition of the materials described above, or can be obtained by laminating, with an extrusion laminating machine, the granulated first sealant layer 16a that has been subjected to melt blending with a melt kneading machine such as a single-screw extruder, a twin-screw extruder and a Brabender mixer in advance.

The second sealant layer 16b can be obtained by directly laminating materials that have been dry-blended as a resin composition for forming a sealant layer so as to achieve the mixing composition of the materials described above with an extrusion laminating machine, or can be obtained by laminating granulation products that have been subjected to melt blending with a melt kneading machine such as a single-screw extruder, a twin-screw extruder and a Brabender mixer in advance by using a tandem laminating process or a coextrusion process in which the first sealant layer 16a and the second sealant layer 16b are extruded by an extrusion laminating machine. Also, by using a resin composition for forming a sealant layer, it is possible to form a single film of the sealant as a casted film in advance, and it is possible to laminate the single film of the sealant by a method in which this film is subjected to sandwich lamination together with an adhesive resin, or it is possible to laminate the single film of the sealant by a dry lamination process using an adhesive.

(Step of Heat Treatment)

The present step is a step of subjecting the laminate to heat treatment. By subjecting the laminate to heat treatment, it is possible to improve the adhesion between the metallic foil layer 13/the anti-corrosion treatment layer 14/the first sealant layer 16a/the second sealant layer 16b to impart better electrolytic solution resistance and hydrofluoric acid resistance to the laminate. With regard to the method for heat treatment, it is preferable to conduct the heat treatment at a temperature, at least higher than or equal to the melting point of the first sealant layer 16a. The three-dimensional network by the associative organic compound may be formed by this step of heat treatment, or this formation can be promoted.

In this way, it is possible to produce the packaging material 20 of the present embodiment as shown in FIG. 2.

Next, one example of a method for producing the packaging material 30 shown in FIG. 3 will be illustrated. Note that a method for producing the packaging material 30 is not limited to the following method.

A method for producing the packaging material 30 of the present embodiment is generally configured by comprising a step of laminating the anti-corrosion treatment layer 14 on the metallic foil layer 13, a step of bonding the substrate layer 11 and the metallic foil layer 13, a step of further laminating the first sealant layer 16a, the third sealant layer 16c and the second sealant layer 16b to produce a laminate, and where appropriate, a step of subjecting the obtained laminate to heat treatment.

(Step of Laminating First Sealant Layer 16a, Third Sealant Layer 16c and Second Sealant Layer 16b)

The present step is a step of forming the first sealant layer 16a, the third sealant layer 16c and the second sealant layer 16b on the anti-corrosion treatment layer 14. Examples of the method for this step include a tandem laminating process or a coextrusion process in which the first sealant layer 16a is extruded together with the third sealant layer 16c and the second sealant layer 16b with an extrusion laminating machine. In this case, it is possible to directly laminate materials that have been dry-blended as a resin composition for forming a sealant layer so as to achieve the mixing composition of the materials described above with an extrusion laminating machine, or it is possible to laminate the granulation products that have been subjected to melt blending with a melt kneading machine such as a single-screw extruder, a twin-screw extruder and a Brabender mixer in advance by means of a tandem laminating process or a coextrusion process in which the first sealant layer 16a is extruded together with the third sealant layer 16c and the second sealant layer 16b with an extrusion laminating machine.

It is also possible to laminate the third sealant layer 16c and the second sealant layer 16b to form films by coextrusion, and subjecting these films to sandwich lamination together with a resin composition for forming the first sealant layer 16a.

In this way, it is possible to produce the packaging material 30 of the present embodiment as shown in FIG. 3.

Although preferable embodiments of the packaging material for a power storage device of the present invention have been described above in detail, the present invention is not limited to such certain embodiments, and a variety of variations and modifications can be made within the scope of the present invention defined in the claims. For example, in a case where a packaging material for a power storage device not having the first adhesive layer 12 is produced, as described above, it is possible to form the substrate layer 11 by applying or coating a resin material capable of forming the substrate layer 11 onto the metallic foil layer 13.

The packaging material for a power storage device of the present invention can be suitably used as a packaging material, for example, for power storage devices such as secondary batteries such as lithium ion batteries, nickel-hydrogen batteries and lead storage batteries, and electrochemical capacitors such as electric double layer capacitors. Among these, the packaging material for a power storage device of the present invention is suitable as a packaging material for a lithium ion battery.

EXAMPLES

The present invention will be specifically illustrated below with reference to Examples; however, the present invention is not limited to the following Examples.

[Materials Used]

The material used in Examples and Comparative Examples are shown as follows.

<Substrate Layer (Thickness of 15 μm)>

A nylon (Ny) film (manufactured by Toyobo Co., Ltd.) was used.

<First Adhesive Layer (Thickness of 4 μm)>

A polyurethane-based adhesive (manufactured by TOYO INK Co., Ltd.) in which a curing agent based on an adduct of tolylenediisocyanate is mixed into a polyester polyol-based base material was used.

<First Anti-Corrosion Treatment Layer (on the Side of Substrate Layer) and Second Anti-Corrosion Treatment Layer (on the Side of Sealant Layer)>

(CL-1): a "sol of sodium polyphosphate stabilized cerium oxide" in which the concentration of solids has been adjusted to 10% by mass using distilled water as a solvent was used. Note that the sol of sodium polyphosphate stabilized cerium oxide was obtained by the incorporation of 10 parts by mass of Na salt of phosphoric acid per 100 parts by mass of cerium oxide.

(CL-2): a composition consisting of 90% by mass of "polyallylamine (manufactured by Nitto Boseki Co., Ltd.)" in which the concentration of solids has been adjusted to 5% by mass using distilled water as a solvent, and 10% by mass of "polyglycerol polyglycidyl ether (manufactured by Nagase ChemteX Corporation)" was used.

(CL-3): On the basis of a water soluble phenol resin (manufactured by Sumitomo Bakelite Co., Ltd.) in which the concentration of solids has been adjusted to 1% by mass using an aqueous solution of phosphoric acid at the concentration of 1% by mass as a solvent, a chemical conversion treating agent in which the concentration of chromium fluoride ($CrF_3$) has been adjusted to be 10 $mg/m^2$ in terms of the amount of Cr present in the final dried coat was used.

<Metallic Foil Layer (Thickness of 35 μm)>

A soft aluminum foil (manufactured by Toyo Aluminum K.K., "8079 material") subjected to annealing degreasing treatment was used.

<Second Adhesive Layer (Thickness of 3 μm)>

The following adhesive a was provided as an adhesive for forming a second adhesive layer.

Adhesive a: an adhesive in which 10 parts by mass (the ratio by solids) of polyisocyanate compound with an isocyanurate structure was mixed per 100 parts by mass of an acid-modified polyolefin resin dissolved in toluene.

<Sealant Layer>

[Base Resin Composition]

As base resin compositions for forming a sealant layer, the following resins A, B and C were provided.

(Resin A): a mixture in which the following materials were mixed in a mass ratio of (AR-1):(AR-2)=75:25. Note that this mixture corresponds to the resin composition β.

(AR-1): an acid-modified polypropylene resin composition based on a random polypropylene (PP) and in which ethylene-propylene rubber was formulated as incompatible rubber.

(AR-2): a propylene-α-olefin copolymer with an atactic structure.

(Resin B): a resin composition in which the following materials were mixed in a mass ratio of (A):(B-1):(B-2)=70:20:10. Note that this mixture corresponds to the resin composition α.

(A): a propylene-ethylene random copolymer (random PP).

(B-1): propylene-1-butene random copolymer elastomer (propylene-1-butene) having compatibility with the (A) component.

(B-2): ethylene-1-butene random copolymer elastomer (ethylene-1-butene) not having compatibility with the (A) component.

(Resin C): an acid-modified polypropylene resin composition (same as the above (AR-1) component) based on random polypropylene (PP) and in which ethylene-propylene rubber was formulated as incompatible rubber.

[Associative Organic Compound]

(T-1): a nonitol derivative

[Chemical Formula 3]

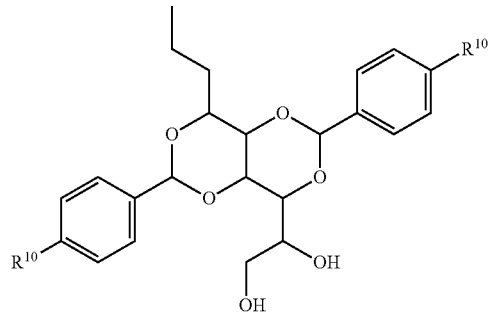

$R^{10}$=—H, —$CH_3$, —$CH_2$—$CH_3$, or —$CH_2$—$CH_2$—$CH_3$ (T-2): a sorbitol derivative

[Chemical Formula 4]

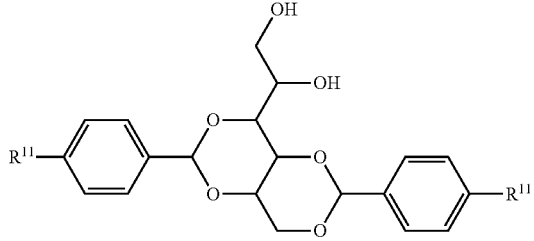

$R^{11}$=—H, —$CH_3$, —$CH_2$—$CH_3$, or —$CH_2$—$CH_2$—$CH_3$ (T-3): an amide derivative (cis-1,3,5-cyclohexane tricarboxamide)

[Chemical Formula 5]

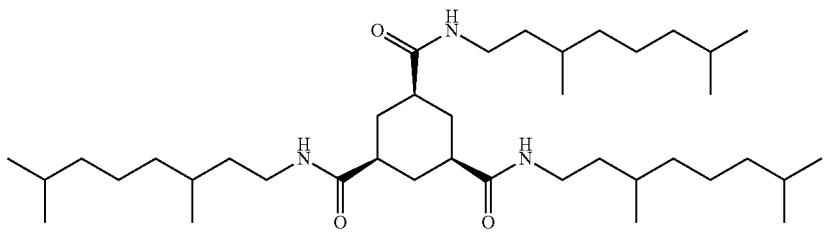

(T-4): a fatty acid derivative (12-hydroxystearic acid)

[Chemical Formula 6]

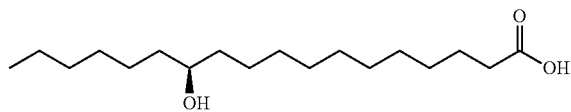

(T-5): a cyclic dipeptide derivative (cyclo(L-asparaginyl-L-phenylalanyl))

[Chemical Formula 7]

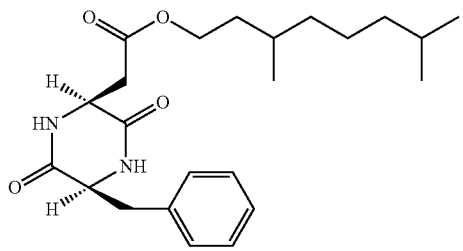

(T-6): an amide derivative (erucamide (cis-13-docosenamide))

[Chemical Formula 8]

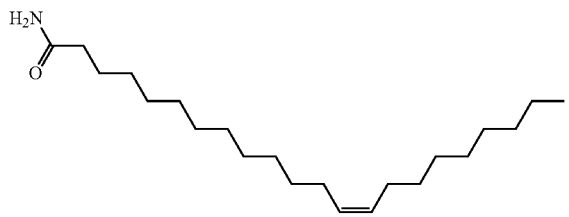

Example 1

First of all, the first and second anti-corrosion treatment layers were disposed on the metallic foil layer by the following procedure. In other words, (CL-1) was applied onto both faces of the metallic foil layer so as to achieve a dry amount to be applied of 70 mg/m² by microgravure coating, and was subjected to burning treatment at 200° C. in a drying unit. Then, (CL-2) was applied onto the obtained layer so as to achieve a dry amount to be applied of 20 mg/m² by microgravure coating to form a composite layer consisting of (CL-1) and (CL-2) as the first and second anti-corrosion treatment layers. This composite layer undergoes the expression of anti-corrosion performance by combination of two materials of (CL-1) and (CL-2).

Next, the side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). This was placed at an unwinding unit of the extrusion laminating machine, and materials of the sealant layer were coextruded on the second anti-corrosion treatment layer under processing conditions of 290° C. and 100 m/minute to laminate a metallic foil side layer as the sealant layer (hereinafter, also referred to as "AL side layer") (thickness of 10 μm) and the innermost layer (thickness of 20 μm) in this order. Note that, with regard to the AL side layer and the innermost layer, a variety of compounds of their materials have been produced by a twin-screw extruder in advance, and after steps of water cooling and pelletization, were used in the above extrusion laminating. For the formation of the AL side layer, a mixture of the resin A (corresponding to the resin composition β) and the associative organic compound T-1 was used. For the formation of the innermost layer (corresponding to the sealant layer 16b), a mixture of the resin B (corresponding to the resin composition α) and an associative organic compound T-1 was used. Note that the content of the associative organic compound T-1 in the AL side layer and the innermost layer was set to be 0.20% by mass based on the sum of each mass of the AL side layer (corresponding to the sealant layer 16a) and the innermost layer (the sealant layer 16b).

The laminate obtained in this way was subjected to heat treatment so as to set the highest reached temperature at which the laminate reached to be 190° C., and as a result of this, the packaging material of Example 1 (a laminate of the substrate layer/the first adhesive layer/the first anti-corrosion treatment layer/the metallic foil layer/the second anti-corrosion treatment layer/the AL side layer (the sealant layer 16a)/the innermost layer (the sealant layer 16b)) was produced. In the present Example, the AL side layer (the sealant layer 16a) and the innermost layer (the sealant layer 16b) are associative organic compound-containing layers.

Example 2

A packaging material of Example 2 was produced in a manner analogous to as in Example 1, except for the fact that the material used in the formation of the AL side layer (the sealant layer 16a) was replaced by a mixture of the resin A (the resin composition β) and the associative organic compound T-2, and the material used in the formation of the innermost layer (the sealant layer 16b) was replaced by a mixture of the resin B (the resin composition α) and the associative organic compound T-2. Note that the content of the associative organic compound T-2 in the AL side layer and the innermost layer was set to be 0.20% by mass based on the sum of each mass of the AL side layer and the innermost layer. In the present Example, the AL side layer (the sealant layer 16a) and the innermost layer (the sealant layer 16b) are associative organic compound-containing layers.

Example 3

A packaging material of Example 3 was produced in a manner analogous to as in Example 1, except for the fact that the material used in the formation of the AL side layer (the sealant layer 16a) was replaced with a mixture of the resin A (the resin composition β) and the associative organic compound T-3, and the material used in the formation of the innermost layer (the sealant layer 16b) was replaced with a mixture of the resin B (the resin composition α) and the associative organic compound T-3. Note that the content of the associative organic compound T-3 in the AL side layer and the innermost layer was set to be 0.20% by mass based on the sum of each mass of the AL side layer and the innermost layer. In the present Example, the AL side layer (the sealant layer 16a) and the innermost layer (the sealant layer 16b) are associative organic compound-containing layers.

Example 4

A packaging material of Example 4 was produced in a manner analogous to as in Example 1, except for the fact that the material used in the formation of the AL side layer (the sealant layer 16a) was replaced with a mixture of the resin A (the resin composition β) and the associative organic compound T-4, and the material used in the formation of the innermost layer (the sealant layer 16b) was replaced with a mixture of the resin B (the resin composition α) and the associative organic compound T-4. Note that the content of the associative organic compound T-4 in the AL side layer and the innermost layer was set to be 0.20% by mass based on the sum of each mass of the AL side layer and the innermost layer. In the present Example, the AL side layer (the sealant layer 16a) and the innermost layer (the sealant layer 16b) are associative organic compound-containing layers.

Example 5

A packaging material of Example 5 was produced in a manner analogous to as in Example 1, except for the fact that the material used in the formation of the AL side layer (the sealant layer 16a) was replaced with a mixture of the resin A (the resin composition β) and the associative organic compound T-5, and the material used in the formation of the innermost layer (the sealant layer 16b) was replaced with a mixture of the resin B (the resin composition α) and the associative organic compound T-5. Note that the content of the associative organic compound T-5 in the AL side layer and the innermost layer was set to be 0.20% by mass based on the sum of each mass of the AL side layer and the innermost layer. In the present Example, the AL side layer (the sealant layer 16a) and the innermost layer (the sealant layer 16b) are associative organic compound-containing layers.

Example 6

A packaging material of Example 6 was produced in a manner analogous to as in Example 1, except for the fact that the content of the associative organic compound T-1 in the AL side layer (the sealant layer 16a) and the innermost layer (the sealant layer 16b) was set to be 0.005% by mass based on the sum of each mass of the AL side layer and the innermost layer. In the present Example, the AL side layer (the sealant layer 16a) and the innermost layer (the sealant layer 16b) are associative organic compound-containing layers.

Example 7

A packaging material of Example 7 was produced in a manner analogous to as in Example 1, except for the fact that the content of the associative organic compound T-1 in the AL side layer (the sealant layer 16a) and the innermost layer (the sealant layer 16b) was set to be 0.01% by mass based on the sum of each mass of the AL side layer and the innermost layer. In the present Example, the AL side layer (the sealant layer 16a) and the innermost layer (the sealant layer 16b) are associative organic compound-containing layers.

Example 8

A packaging material of Example 8 was produced in a manner analogous to as in Example 1, except for the fact that the content of the associative organic compound T-1 in the AL side layer (the sealant layer 16a) and the innermost layer (the sealant layer 16b) was set to be 1.00% by mass based on the sum of each mass of the AL side layer and the innermost layer. In the present Example, the AL side layer (the sealant layer 16a) and the innermost layer (the sealant layer 16b) are associative organic compound-containing layers.

Example 9

A packaging material of Example 9 was produced in a manner analogous to as in Example 1, except for the fact that the content of the associative organic compound T-1 in the AL side layer (the sealant layer 16a) and the innermost layer (the sealant layer 16b) was set to be 3.00% by mass based on the sum of each mass of the AL side layer and the innermost layer. In the present Example, the AL side layer (the sealant layer 16a) and the innermost layer (the sealant layer 16b) are associative organic compound-containing layers.

Example 10

A packaging material of example 10 was produced in a manner analogous to as in Example 1, except for the fact that the material used in the formation of the innermost layer (the sealant layer 16b) was replaced with the resin B (the resin composition α). Note that the content of the associative organic compound T-1 in the AL side layer was set to be 0.20% by mass based on the total mass of the AL side layer. In the present Example, the AL side layer (the sealant layer 16a) is an associative organic compound-containing layer.

Example 11

A packaging material of example 11 was produced in a manner analogous to as in Example 1, except for the fact that the material used in the formation of the AL side layer (the sealant layer 16a) was replaced with the resin A (the resin composition β). Note that the content of the associative organic compound T-1 in the innermost layer was set to be 0.20% by mass based on the total mass of the innermost layer. In the present Example, the innermost layer (the sealant layer 16b) is an associative organic compound-containing layer.

Example 12

The first and second anti-corrosion treatment layers were disposed on the metallic foil layer in a manner analogous to as in Example 1. A polyurethane-based adhesive (first adhesive layer) was used to bond the side of the first anti-corrosion treatment layer of the metallic foil layer on which the first and second anti-corrosion treatment layers were disposed, to the substrate layer, by using dry laminating approach. This was placed at an unwinding unit of the extrusion laminating machine, and materials of the sealant layer were coextruded on the second anti-corrosion treatment layer under processing conditions of 290° C. and 100 m/minute to laminate an AL side layer as the sealant layer (the sealant layer 16a) (thickness of 10 μm), an intermediate layer (the sealant layer 16c) (thickness of 10 μm) and the innermost layer (the sealant layer 16b) (thickness of 10 μm) in this order. Note that, with regard to the AL side layer (the sealant layer 16a), the intermediate layer (the sealant layer 16c) and the innermost layer (the sealant layer 16b), a variety of compounds of their materials have been produced by a twin-screw extruder in advance, and after steps of water cooling and pelletization, were used in the above extrusion laminating. In the formation of the AL side layer (the sealant layer 16a), a mixture of the resin A (the resin composition β) and the associative organic compound T-1 was used. For the formation of the intermediate layer (the sealant layer 16c), the resin B (the resin composition α) was used. For the formation of the innermost layer (the sealant layer 16b), the resin B (the resin composition α) was used. Note that the content of the associative organic compound T-1 in the AL side layer (the sealant layer 16a) was set to be 0.20% by mass based on the total mass of the AL side layer (the sealant layer 16a).

The laminate obtained in this way was subjected to heat treatment by heat lamination so as to set the highest reached temperature at which the laminate reached to be 190° C., and as a result of this, the packaging material of Example 12 (a laminate of the substrate layer/the first adhesive layer/the first anti-corrosion treatment layer/the metallic foil layer/the second anti-corrosion treatment layer/the AL side layer (the sealant layer 16a)/the intermediate layer (the sealant layer 16c)/the innermost layer (the sealant layer 16b)) was produced. In the present Example, the AL side layer (the sealant layer 16a) is an associative organic compound-containing layer.

Example 13

A packaging material of Example 13 was produced in a manner analogous to as in Example 12, except for the fact that the material used in the formation of the AL side layer (the sealant layer 16a) was replaced by the resin A (the resin composition β), and the material used in the formation of the intermediate layer (the sealant layer 16c) was replaced by a mixture the resin B (the resin composition α) and the associative organic compound T-1. Note that the content of the associative organic compound T-1 in the intermediate layer (the sealant layer 16c) was set to be 0.20% by mass based on the total mass of the intermediate layer (the sealant layer 16c). In the present Example, the intermediate layer (the sealant layer 16c) is an associative organic compound-containing layer.

Example 14

A packaging material of Example 14 was produced in a manner analogous to as in Example 12, except for the fact that the material used in the formation of the AL side layer (the sealant layer 16a) was replaced with the resin A (the resin composition β), and the material used in the formation of the innermost layer (the sealant layer 16b) was replaced with a mixture of the resin B (the resin composition α) and the associative organic compound T-1. Note that the content of the associative organic compound T-1 in the innermost layer (the sealant layer 16b) was set to be 0.20% by mass based on the total mass of the innermost layer (the sealant layer 16b). In the present Example, the innermost layer (the sealant layer 16b) is an associative organic compound-containing layer.

Example 15

A packaging material of Example 15 was produced in a manner analogous to as in Example 13, except for the fact that the material used in the formation of the innermost layer (the sealant layer 16b) was replaced with a mixture of the resin B (the resin composition α) and the associative organic compound T-1. Note that the content of the associative organic compound T-1 in the innermost layer (the sealant layer 16b) was set to be 0.20% by mass based on the total mass of the innermost layer (the sealant layer 16b). In the present Example, the intermediate layer (the sealant layer 16c) and the innermost layer (the sealant layer 16b) are associative organic compound-containing layers.

Example 16

A packaging material of Example 16 was produced in a manner analogous to as in Example 13, except for the fact that the material used in the formation of the AL side layer (the sealant layer 16a) was replaced with a mixture of the resin A (the resin composition β) and the associative organic compound T-1. Note that the content of the associative organic compound T-1 in the AL side layer (the sealant layer 16a) was set to be 0.20% by mass based on the total mass of the AL side layer (the sealant layer 16a). In the present Example, the AL side layer (the sealant layer 16a) and the intermediate layer (the sealant layer 16c) are associative organic compound-containing layers.

Example 17

First of all, the first and second anti-corrosion treatment layers were disposed on the metallic foil layer by the following procedure. In other words, (CL-3) was applied onto both faces of the metallic foil layer so as to achieve a dry amount to be applied of 30 mg/m$^2$ by microgravure coating, and was subjected to burning treatment at 200° C. in a drying unit. Then, (CL-2) was applied onto the obtained layer so as to achieve the dry amount to be applied of 20 mg/m$^2$ by microgravure coating to form a composite layer consisting of (CL-3) and (CL-2) as the first and second anti-corrosion treatment layers. This composite layer undergoes the expression of anti-corrosion performance by combination of the two materials of (CL-3) and (CL-2). In this way, a packaging material of Example 17 was produced in a manner analogous to as in Example 1, except for the fact that the metallic foil layer on which the first and second anti-corrosion treatment layers were disposed was used. In the present Example, the AL side layer (the sealant layer 16a) and the innermost layer (the sealant layer 16b) are associative organic compound-containing layers.

Example 18

First of all, the first and second anti-corrosion treatment layers were disposed on the metallic foil layer by the following procedure. In other words, (CL-3) was applied onto both faces of the metallic foil layer so as to achieve a dry amount to be applied of 30 mg/m$^2$ by microgravure coating, and was subjected to burning treatment at 200° C. in a drying unit to form the first and second anti-corrosion treatment layers. In this way, a packaging material was produced in a manner analogous to as in Example 1, except for the fact that the metallic foil layer on which the first and second anti-corrosion treatment layer was disposed was used. In the present Example, the AL side layer (the sealant layer 16a) and the innermost layer (the sealant layer 16b) are associative organic compound-containing layers.

Example 19

A packaging material of Example 19 was produced in a manner analogous to as in Example 1, except for the fact that the material used in the formation of the AL side layer (the sealant layer 16a) was replaced with a mixture of the resin C and the associative organic compound T-1. Note that the content of the associative organic compound T-1 in the AL side layer (the sealant layer 16a) was set to be 0.20% by mass based on the total mass of the AL side layer (the sealant layer 16a). In the present Example, the AL side layer (the sealant layer 16a) and the innermost layer (the sealant layer 16b) are associative organic compound-containing layers.

Example 20

The first and second anti-corrosion treatment layers were disposed on the metallic foil layer in a manner analogous to as in Example 1. The side of the first anti-corrosion treatment layer of the metallic foil layer on which the first and second anti-corrosion treatment layers were disposed was bonded to substrate layer by a dry laminating approach using a polyurethane-based adhesive (the first adhesive layer). Then, the side of the second anti-corrosion treatment layer of the metallic foil layer on which the first and second anti-corrosion treatment layers were disposed was bonded to the sealant layer 16 (the innermost layer) (thickness of 30 µm) by a dry laminating approach using the adhesive a (the second adhesive layer). A mixture of the resin B (the base resin composition, the resin composition α) and the associative organic compound T-1 was used to form the innermost layer (the sealant layer 16). Note that the content of the associative organic compound T-1 in the innermost layer (the sealant layer 16) was set to be 0.20% by mass based on the total mass of the innermost layer (the sealant layer 16).

In this way, the obtained laminate was subjected to aging treatment at 40° C. for 4 days to produce a packaging material of Example 20 (a laminate of the substrate layer/the first adhesive layer/the first anti-corrosion treatment layer/the metallic foil layer/the second anti-corrosion treatment layer/the second adhesive layer/the innermost layer (the sealant layer 16)). In the present Example, the innermost layer (the sealant layer 16) is an associative organic compound-containing layer.

Comparative Example 1

A packaging material of Comparative Example 1 was produced in a manner analogous to as in Example 1, except for the fact that the associative organic compound was not used, in other words, the fact that the resin A was used in the formation of the AL side layer (the sealant layer 16a), and the resin B was used in the formation of the innermost layer (the sealant layer 16b).

Comparative Example 2

A packaging material of Comparative Example 2 was produced in a manner analogous to as in Example 1, except for the fact that the material used in the formation of the AL side layer (the sealant layer 16a) was replaced with a mixture of the resin A (the resin composition β) and the associative organic compound T-6, and the material used in the formation of the innermost layer (the sealant layer 16b) was replaced with a mixture of the resin B (the resin composition α) and the associative organic compound T-6. Note that the content of the associative organic compound T-6 in the AL side layer and the innermost layer was set to be 0.20% by mass based on the sum of each mass of the AL side layer and the innermost layer. In the present Example, the AL side layer (the sealant layer 16a) and the innermost layer (the sealant layer 16b) are associative organic compound-containing layers.

Principal conditions with regard to each of the Examples and the Comparative Examples are shown in Table 1.

TABLE 1

| | | | Sealant layer | | | | | |
| | | | Type of base resin composition and thickness of each layer | | | Type of associative organic compound and the amount added in each layer | | | Content of the associative organic compound in the sealant layer based |
| | Anti-corrosion treatment layer | Second adhesive layer | AL side layer | Intermediate layer | Innermost layer | AL side layer | Intermediate layer | Innermost layer | on the total mass of the sealant layer |
|---|---|---|---|---|---|---|---|---|---|
| Example 1 | (CL-1) + (CL-2) | — | Resin A (10 µm) | — | Resin B (20 µm) | T-1 (0.20% by mass) | — | T-1 (0.20% by mass) | 0.20% by mass |
| Example 2 | (CL-1) + (CL-2) | — | Resin A (10 µm) | — | Resin B (20 µm) | T-2 (0.20% by mass) | — | T-2 (0.20% by mass) | 0.20% by mass |
| Example 3 | (CL-1) + (CL-2) | — | Resin A (10 µm) | — | Resin B (20 µm) | T-3 (0.20% by mass) | — | T-3 (0.20% by mass) | 0.20% by mass |
| Example 4 | (CL-1) + (CL-2) | — | Resin A (10 µm) | — | Resin B (20 µm) | T-4 (0.20% by mass) | — | T-4 (0.20% by mass) | 0.20% by mass |
| Example 5 | (CL-1) + (CL-2) | — | Resin A (10 µm) | — | Resin B (20 µm) | T-5 (0.20% by mass) | — | T-5 (0.20% by mass) | 0.20% by mass |
| Example 6 | (CL-1) + (CL-2) | — | Resin A (10 µm) | — | Resin B (20 µm) | T-1 (0.005% by mass) | — | T-1 (0.005% by mass) | 0.005% by mass |
| Example 7 | (CL-1) + (CL-2) | — | Resin A (10 µm) | — | Resin B (20 µm) | T-1 (0.01% by mass) | — | T-1 (0.01% by mass) | 0.01% by mass |
| Example 8 | (CL-1) + (CL-2) | — | Resin A (10 µm) | — | Resin B (20 µm) | T-1 (1.00% by mass) | — | T-1 (1.00% by mass) | 1.00% by mass |
| Example 9 | (CL-1) + (CL-2) | — | Resin A (10 µm) | — | Resin B (20 µm) | T-1 (3.00% by mass) | — | T-1 (3.00% by mass) | 3.00% by mass |
| Example 10 | (CL-1) + (CL-2) | — | Resin A (10 µm) | — | Resin B (20 µm) | T-1 (0.20% by mass) | — | — | 0.07% by mass |
| Example 11 | (CL-1) + (CL-2) | — | Resin A (10 µm) | — | Resin B (20 µm) | — | — | T-1 (0.20% by mass) | 0.13% by mass |
| Example 12 | (CL-1) + (CL-2) | — | Resin A (10 µm) | Resin B (10 µm) | Resin B (10 µm) | T-1 (0.20% by mass) | — | — | 0.07% by mass |
| Example 13 | (CL-1) + (CL-2) | — | Resin A (10 µm) | Resin B (10 µm) | Resin B (10 µm) | — | T-1 (0.20% by mass) | — | 0.07% by mass |

TABLE 1-continued

| | | | Sealant layer | | | | | |
|---|---|---|---|---|---|---|---|---|
| | | | Type of base resin composition and thickness of each layer | | | Type of associative organic compound and the amount added in each layer | | Content of the associative organic compound in the sealant layer based |
| | Anti-corrosion treatment layer | Second adhesive layer | AL side layer | Intermediate layer | Innermost layer | AL side layer | Intermediate layer | Innermost layer | on the total mass of the sealant layer |
| Example 14 | (CL-1) + (CL-2) | — | Resin A (10 µm) | Resin B (10 µm) | Resin B (10 µm) | — | — | T-1 (0.20% by mass) | 0.07% by mass |
| Example 15 | (CL-1) + (CL-2) | — | Resin A (10 µm) | Resin B (10 µm) | Resin B (10 µm) | — | T-1 (0.20% by mass) | T-1 (0.20% by mass) | 0.13% by mass |
| Example 16 | (CL-1) + (CL-2) | — | Resin A (10 µm) | Resin B (10 µm) | Resin B (10 µm) | T-1 (0.20% by mass) | T-1 (0.20% by mass) | — | 0.13% by mass |
| Example 17 | (CL-3) + (CL-2) | — | Resin A (10 µm) | — | Resin B (20 µm) | T-1 (0.20% by mass) | — | T-1 (0.20% by mass) | 0.20% by mass |
| Example 18 | (CL-3) | — | Resin A (10 µm) | — | Resin B (20 µm) | T-1 (0.20% by mass) | — | T-1 (0.20% by mass) | 0.20% by mass |
| Example 19 | (CL-1) + (CL-2) | — | Resin C (10 µm) | — | Resin B (20 µm) | T-1 (0.20% by mass) | — | T-1 (0.20% by mass) | 0.20% by mass |
| Example 20 | (CL-1) + (CL-2) | Adhesive a | — | — | Resin B (30 µm) | — | — | T-1 (0.20% by mass) | 0.20% by mass |
| Comparative Example 1 | (CL-1) + (CL-2) | — | Resin A (10 µm) | — | Resin B (20 µm) | — | — | — | 0% by mass |
| Comparative Example 2 | (CL-1) + (CL-2) | — | Resin A (10 µm) | — | Resin B (20 µm) | T-6 (0.20% by mass) | — | T-6 (0.20% by mass) | 0.20% by mass |

<Evaluation>

The following evaluation tests were conducted on the packaging materials obtained in Examples and Comparative Examples.

(Electrolytic Solution Laminating Strength)

An electrolytic solution in which $LiPF_6$ was added to a mixed solution of ethylene carbonate/diethyl carbonate/dimethyl carbonate=1/1/1 (mass ratio) to achieve an amount of 1 M was loaded in a Teflon (R) vessel, and a sample obtained by cutting the packaging material into 15 mm×100 mm was placed in this vessel, and after well-stoppered, this vessel was stored at 85° C. for 24 hours. Next, washing together was conducted, and laminating strength (T-peel strength) between the metallic foil layer/the sealant layer was measured by a testing machine (manufactured by INSTRON). The test was conducted according to JIS K6854 at 23° C. under an atmosphere of 50% RH with a peeling rate of 50 mm/minute. On the basis of the results, evaluation was conducted according to the following criteria.
A: Laminating strength is greater than 7 N/15 mm
B: Laminating strength is 6 N/15 mm or more, and 7 N/15 mm or less
C: Laminating strength is 5 N/15 mm or more, and less than 6 N/15 mm
D: Laminating strength is less than 5 N/15 mm (Electrolytic Solution Heat Sealing Strength)

Figure 4:
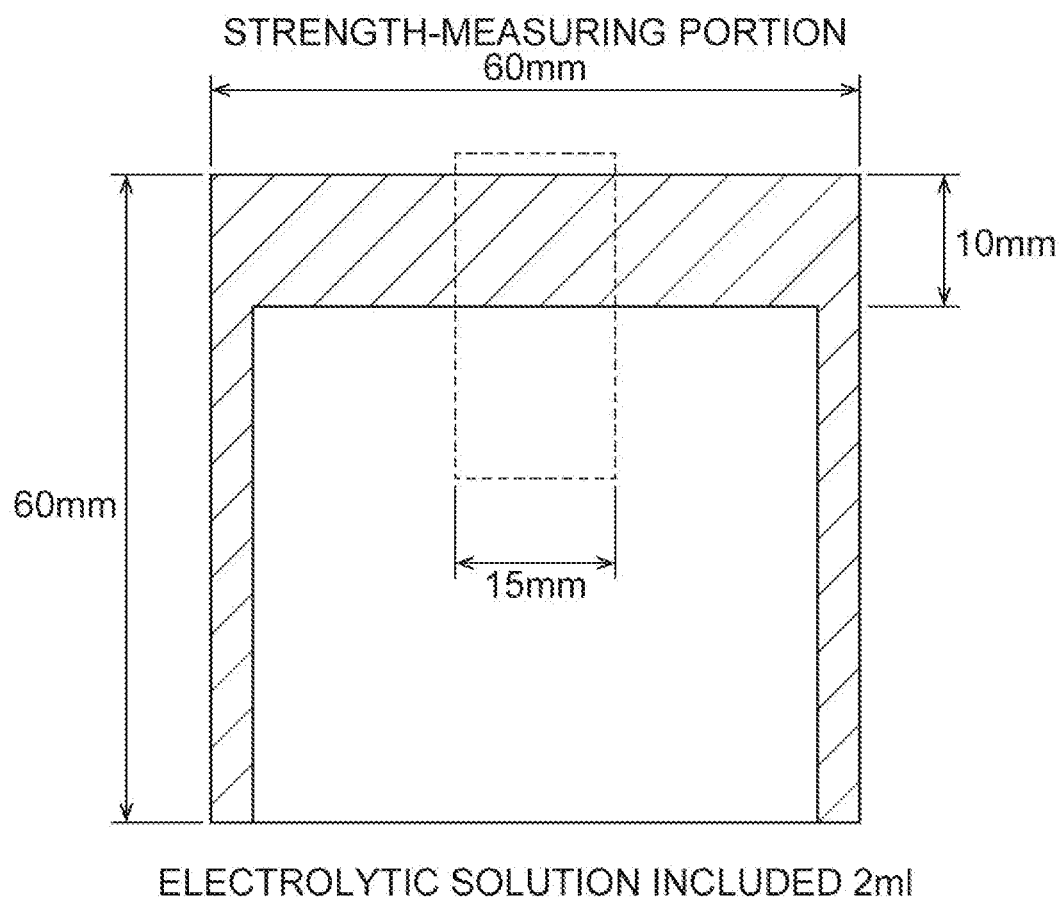
FIG. 4 is a schematic view illustrating a method for producing a sample to be evaluated in Examples.

A sample obtained by cutting the packaging material into 60 mm×120 mm was folded into two, and one side of the folded sample was heat-sealed with a sealing bar with a width of 10 mm at 190° C. and 0.5 MPa for 3 seconds. Next, the remaining two sides of the folded sample were also heat-sealed to achieve a bag-shaped packaging material, and within this bag-shaped packaging material, the pouch in which 2 ml of electrolytic solution in which $LiPF_6$ was added into a mixed solution of ethylene carbonate/diethyl carbonate/dimethyl carbonate=1/1/1 (mass ratio) to achieve an amount of 1 M has been injected was stored at 60° C. for 24 hours, and subsequently, the firstly heat-sealed one side was cut to have a width of 15 mm (see FIG. 4), and sealing strength (T-peel strength) was measured by a testing machine (manufactured by INSTRON). The test was conducted according to JIS K6854 at 23° C. under an atmosphere of 50% RH with a peeling rate of 50 mm/minute. On the basis of the results, the evaluation was conducted according to the following criteria.
A: Sealing strength is 50 N/15 mm or more, and burst width is greater than 5 mm
B: Sealing strength is 50 N/15 mm or more, and burst width is 3 to 5 mm
C: Sealing strength is 40 N/15 mm or more and less than 50 N/15 mm
D: Sealing strength is less than 40 N/15 mm (Degassing Heat Seal Strength (Degas Heat Seal Strength))

Figure 5:
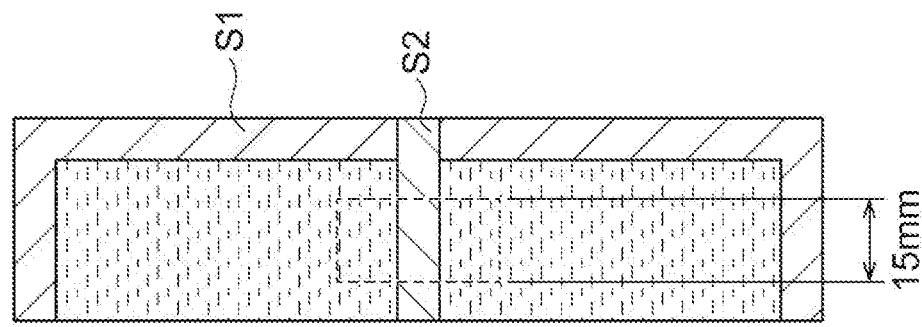
FIGS. 5(a)-5(c) are schematic views illustrating a method for producing a sample to be evaluated in Examples.
Figure 5:
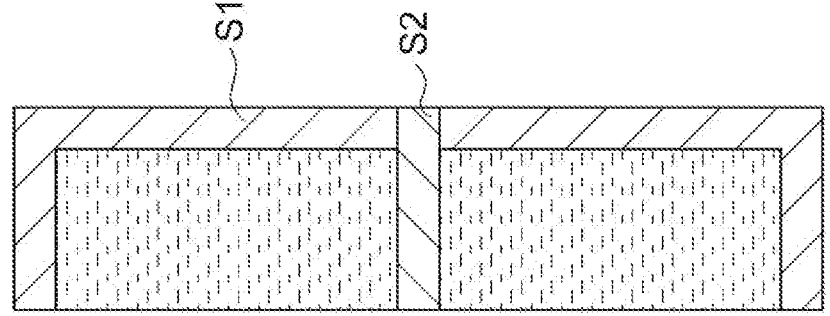
Figure 5:
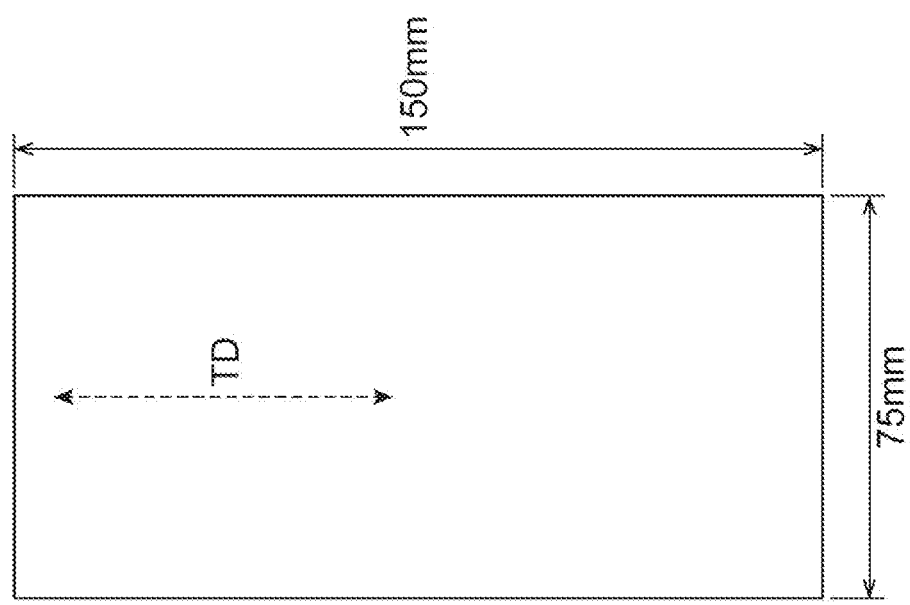

A sample obtained by cutting the packaging material into 75 mm×150 mm was folded into two to be 37.5 mm×150 mm (see FIG. 5(a)), and subsequently, the side of 150 mm length and one of the sides of 37.5 mm length were heat-sealed to produce a pouch. Next, into this pouch, 5 ml of electrolytic solution in which $LiPF_6$ was added into a mixed solution of ethylene carbonate/diethyl carbonate/dimethyl carbonate=1/1/1 (mass ratio) to achieve an amount of 1 M was injected, and the other side of 37.5 mm length was heat-sealed to obtain a pouch sealed by a sealed portion S1. Then, after storing this pouch at 60° C. for 24 hours, the central portion of the pouch including the electrolytic solution was heat-sealed at 190° C. and 0.3 MPa for 2 seconds (degassing heat sealed portion S2, see FIG. 5(b)). In order to stabilize the sealed portion, after stored at normal temperatures for 24 hours, the region including the degassing heat sealed portion S2 was cut to a width of 15 mm (see FIG. 5(c)), heat seal strength (T-peel strength) was measured by a testing machine (manufactured by INSTRON). The test was conducted according to JIS K6854 at 23° C. under an atmosphere of 50% RH with a peeling rate of 50 mm/minute. On the basis of the results, the evaluation was conducted according to the following criteria.
A: Sealing strength is 50 N/15 mm or more
B: Sealing strength is 35 N/15 mm or more and less than 50 N/15 mm C: Sealing strength is 25 N/15 mm or more and less than 35 N/15 mm
D: Sealing strength is less than 25 N/15 mm (Insulation Properties after Degassing Heat Sealing (Degassing Insulation))

Figure 6A:
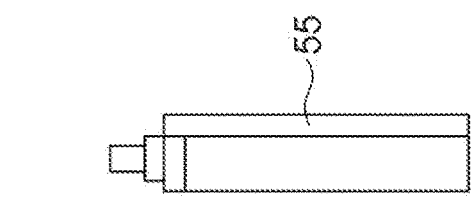
FIGS. 6(a)-6(f) are schematic views illustrating a method for producing a sample to be evaluated in Examples.
Figure 6B:
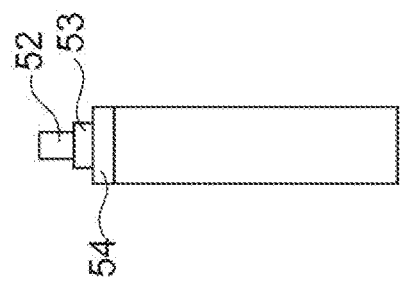
Figure 6C:
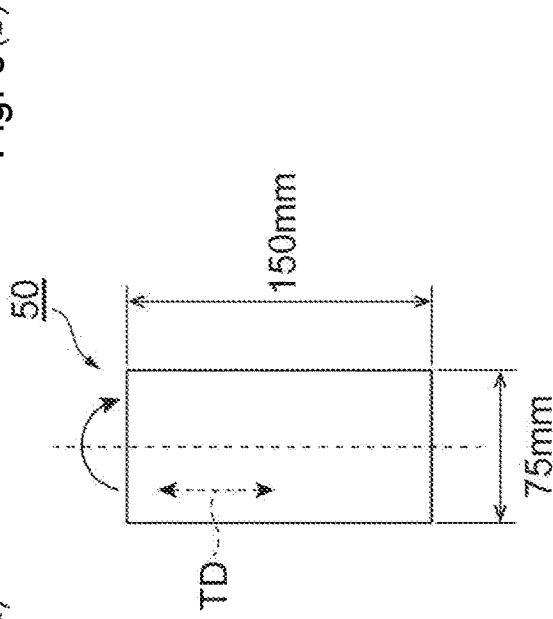
Figure 6D:
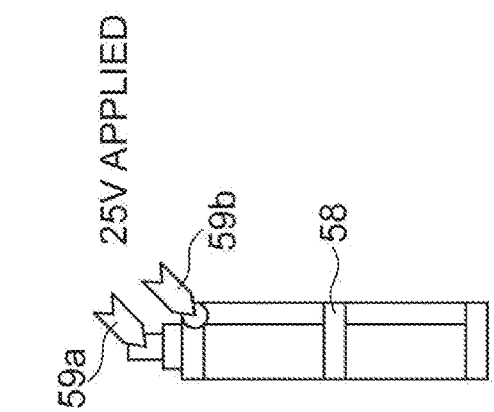
Figure 6E:
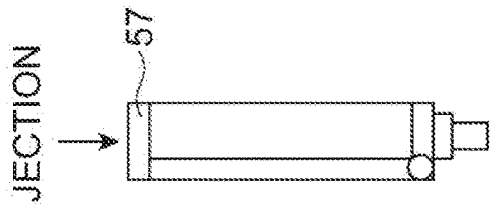
Figure 6F:
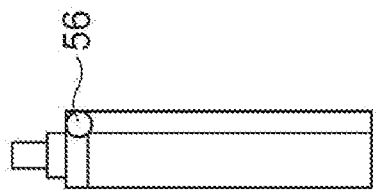

A sample 50 obtained by cutting the packaging material into 75 mm×150 mm was folded into two to be 37.5 mm×150 mm (see FIG. 6(a)). Then, an upper side portion 54 of 37.5 mm was heat-sealed with interposing a tab 52 and a tab sealant 53 (see FIG. 6(b)), and subsequently, a lateral side portion 55 of 150 mm was heat-sealed to produce a pouch (see FIG. 6(c)). Next, in order to enable contact with the electrode, a portion of the outer layer of the sample 50 was cut away to form an exposed portion 56 of the metallic foil layer (see FIG. 6(d)). Then, 5 ml of electrolytic solution in which $LiPF_6$ was added into a mixed solution of ethylene carbonate/diethyl carbonate/dimethyl carbonate=1/1/1 (mass ratio) to achieve an amount of 1 M was injected in the pouch, and a lower side portion 57 of 37.5 mm was sealed by heat seal (see FIG. 6(e)). Next, this pouch was allowed to stand at 60° C. for 24 hours in a flatly placed state, and the central portion of the pouch 58 including the electrolytic solution was subjected to degassing heat seal at 190° C. and 0.3 MPa (surface pressure) for 2 seconds. Then, the tab 52 and the exposed portion 56 of the metallic foil layer were respectively connected with electrodes 59a, 59b, and by applying 25 V using a withstanding voltage/insulation resistance tester (manufactured by KIKUSUI ELECTRONICS CORPORATION, "TOS9201"), the resistance value at the moment was measured (see FIG. 6(f)). On the basis of the results, the evaluation was conducted according to the following criteria.

A: Resistance value is greater than 200 MΩ
B: Resistance value is 100 MΩ or more and 200 MΩ or less
C: Resistance value is 30 MΩ or more and less than 100 MΩ
D: Resistance value is less than 30 MΩ

(Overall Quality)

The results of each of the above evaluations are shown in Table 2. In the following Table 2, the items having no evaluation of D with regard to the results of each evaluation are considered to have good overall quality.

TABLE 2

| | Electrolytic solution laminating strength | Electrolytic solution heat sealing strength | Degassing heat seal strength | Degassing insulation |
|---|---|---|---|---|
| Example 1 | A | A | A | A |
| Example 2 | A | A | A | A |
| Example 3 | A | A | A | C |
| Example 4 | A | A | A | B |
| Example 5 | A | A | A | B |
| Example 6 | A | A | A | C |
| Example 7 | A | A | A | B |
| Example 8 | B | B | B | A |
| Example 9 | C | C | C | B |
| Example 10 | A | A | A | B |
| Example 11 | A | A | A | C |
| Example 12 | A | A | A | B |
| Example 13 | A | A | A | C |
| Example 14 | A | A | A | C |
| Example 15 | A | A | A | B |
| Example 16 | A | A | A | A |

TABLE 2-continued

| | Electrolytic solution laminating strength | Electrolytic solution heat sealing strength | Degassing heat seal strength | Degassing insulation |
|---|---|---|---|---|
| Example 17 | B | B | B | A |
| Example 18 | C | C | C | B |
| Example 19 | B | B | B | B |
| Example 20 | A | A | A | A |
| Comparative Example 1 | A | A | A | D |
| Comparative Example 2 | A | A | A | D |

As is obvious from the results shown in Table 2, it has been confirmed that the packaging materials of Examples 1 to 20 have good insulation properties after degassing heat sealing. In addition, it has been confirmed that the packaging materials of Examples 1 to 20 also have sufficient performance with regard to the electrolytic solution laminating strength, the electrolytic solution heat sealing strength, and the degassing heat seal strength. By contrast to this, in Comparative Example 1 in which the associative organic compound was not used, it has been confirmed that the insulation properties after degassing heat sealing is inferior.

With comparison of Examples 1 to 5, it has been confirmed that the insulation properties after degassing heat sealing are particularly good in Examples 1 and 2 in which the sorbitol derivative or the nonitol derivative was used as an associative organic compound. Also, with regard to Comparative Example 2 in which the associative organic compound (T-6) having only one associative functional group was used, it has been confirmed that the insulation properties after degassing heat sealing is inferior. Note that, in the associative organic compound T-1 (the nonitol derivative) used in Example 1, $R^{10}$ represents a hydrogen atom or an alkyl group having 1 to 3 carbon atoms, and even in either case where $R^{10}$ is a hydrogen atom or where $R^{10}$ is an alkyl group having 1 to 3 carbon atoms, it is possible to achieve almost equivalent effects. Also, in the associative organic compound T-2 (the sorbitol derivative) used in Example 2, $R^{11}$ represents a hydrogen atom or an alkyl group having 1 to 3 carbon atoms, and even in either case where $R^{11}$ is a hydrogen atom or where $R^{11}$ is an alkyl group having 1 to 3 carbon atoms, it is possible to achieve almost equivalent effects.

In addition, with comparison of Examples 6 to 9 and Comparative Example 1, it has been confirmed that the insulation properties after degassing heat sealing are enhanced by adding the associative organic compound to the sealant layer, and further enhanced by increasing the amount added.

With comparison of Examples 10 to 16, it has been confirmed that, in the cases where the sealant layer consists of a plurality of layers, the insulation properties after degassing heat sealing tends to enhance by using the associative organic compound-containing layer for the Al side layer.

When comparing Example 17 and Example 1, it has been confirmed that, due to the difference in the compositions of the anti-corrosion treatment layers, the difference in the evaluation of the laminating strength and the sealing strength occurred. With comparison of Example 18 and Example 1, it has been confirmed that the difference in the evaluation of the laminating strength and the sealing strength occurred. In Example 18, it is considered that the insulation properties after degassing heat sealing decreased due do the decrease in sealing strength.

INDUSTRIAL APPLICABILITY

The present invention is useful as a packaging material for a power storage device.

REFERENCE SIGNS LIST 10, 20 . . . Packaging material for power storage device, 11 . . . Substrate layer, 12 . . . First adhesive layer, 13 . . . Metallic foil layer, 14 . . . Anti-corrosion treatment layer, 16 . . . Sealant layer, 16a . . . First sealant layer, 16b . . . Second sealant layer, 16c . . . Third sealant layer, 17 . . . Second adhesive layer, 50 . . . Sample, 52 . . . Tab, 53 . . . Tab sealant, 54 . . . Upper side portion, 55 . . . Lateral side portion, 56 . . . Exposed portion of metallic foil layer, 57 . . . Lower side portion, 58 . . . Central portion, 59a, 59b . . . Electrode, S1 . . . Sealed portion, S2 . . . Degassing heat sealed portion.

The invention claimed is:

1. A power storage device packaging material comprising:
a substrate layer;
a metallic foil layer with an anti-corrosion treatment layer being disposed on one face or both faces thereof; and
a sealant layer having a thickness of from 5 μm to 100 μm, in an order of the substrate layer, the metallic foil layer and the sealant layer,
wherein
the sealant layer comprises an associative organic compound having two or more associative functional groups and a hydrocarbon group having 4 or more carbon atoms,
the sealant layer consists of a plurality of layers, and a layer closest to the metallic foil layer among the plurality of the layers includes the associative organic compound, and
the layer closest to the metallic foil layer includes acid-modified polypropylene and polypropylene with an atactic structure or a propylene-α-olefin copolymer with an atactic structure.

2. The power storage device packaging material according to claim 1, wherein the associative organic compound is a sorbitol derivative represented by a following chemical formula (1), or a nonitol derivative represented by a following chemical formula (2),

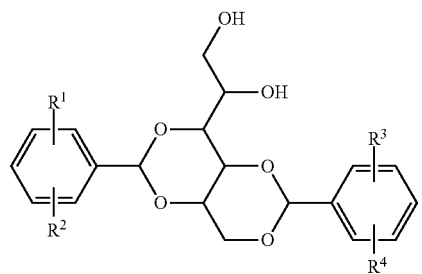
(1)

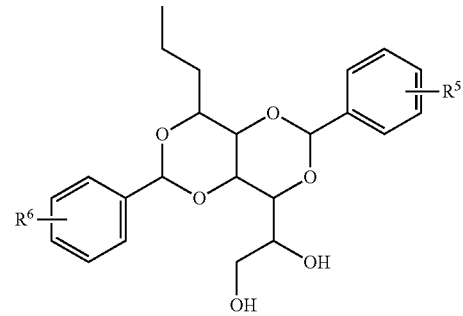
(2)

where, in the chemical formula (1), $R^1$ to $R^4$ each independently represent a hydrogen atom or a hydrocarbon group having 1 to 6 carbon atoms, and in the chemical formula (2), $R^5$ and $R^6$ each independently represent a hydrogen atom or a hydrocarbon group having 1 to 6 carbon atoms.

3. The power storage device packaging material according to claim 1, wherein a content of the associative organic compound is 0.01 to 1.0% by mass based on a total mass of the sealant layer.

4. The power storage device packaging material according to claim 1, wherein the sealant layer consists of a plurality of layers, and at least one layer of the plurality of the layers is a layer comprising the associative organic compound.

5. The power storage device packaging material according to claim 1, wherein the anti-corrosion treatment layer comprises cerium oxide, 1 to 100 parts by mass of phosphoric acid or a phosphate per 100 parts by mass of the cerium oxide, and a cationic polymer.

* * * * *